United States Patent
Chen et al.

(10) Patent No.: US 7,409,487 B1
(45) Date of Patent: Aug. 5, 2008

(54) VIRTUALIZATION SYSTEM FOR COMPUTERS THAT USE ADDRESS SPACE INDENTIFIERS

(75) Inventors: Xiaoxin Chen, Fremont, CA (US); Alberto J. Munoz, Los Altos, CA (US); Sahil Rihan, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 935 days.

(21) Appl. No.: 10/609,877

(22) Filed: Jun. 30, 2003

(51) Int. Cl.
*G06F 12/00* (2006.01)
*G06F 9/26* (2006.01)
*G06F 21/00* (2006.01)

(52) U.S. Cl. .......................... 711/6; 711/209
(58) Field of Classification Search ............ 711/6, 711/209
See application file for complete search history.

(56) References Cited

U.S. PATENT DOCUMENTS 5,295,251 A * 3/1994 Wakui et al. .............. 718/100
5,555,385 A * 9/1996 Osisek ..................... 711/1
2003/0120856 A1 * 6/2003 Neiger et al. .............. 711/6

\* cited by examiner

*Primary Examiner*—Reginald G. Bragdon
*Assistant Examiner*—Aracelis Ruiz
(74) *Attorney, Agent, or Firm*—Darryl A. Smith

(57) ABSTRACT

A virtual computer system including multiple virtual machines (VMs) is implemented in a physical computer system that uses address space identifiers (ASIDs). Each VM includes a virtual translation look-aside buffer (TLB), in which guest software, executing on the VM, may insert address translations, with each translation including an ASID. For each ASID used by guest software, a virtual machine monitor (VMM), or other software unit, assigns a unique shadow ASID for use in corresponding address translations in a hardware TLB. If a unique shadow ASID is not available for a newly used guest ASID, the VMM reassigns a shadow ASID from a prior guest ASID to the new guest ASID, purging any entries in the hardware TLB corresponding to the prior guest ASID. Assigning unique shadow ASIDs limits the need for TLB purges upon switching between the multiple VMs, reducing the number of TLB miss faults, and consequently improving overall processing efficiency.

20 Claims, 13 Drawing Sheets

| ASID TABLE | | |
|---|---|---|
| SOURCE ID | SOURCE ASID | SHADOW ASID |
| 300A | 1 | 5 |
| 300B | 13 | 26 |
| 300B | 1963 | 2003 |
| 300A | 13 | 13 |
| ⋮ | ⋮ | ⋮ |

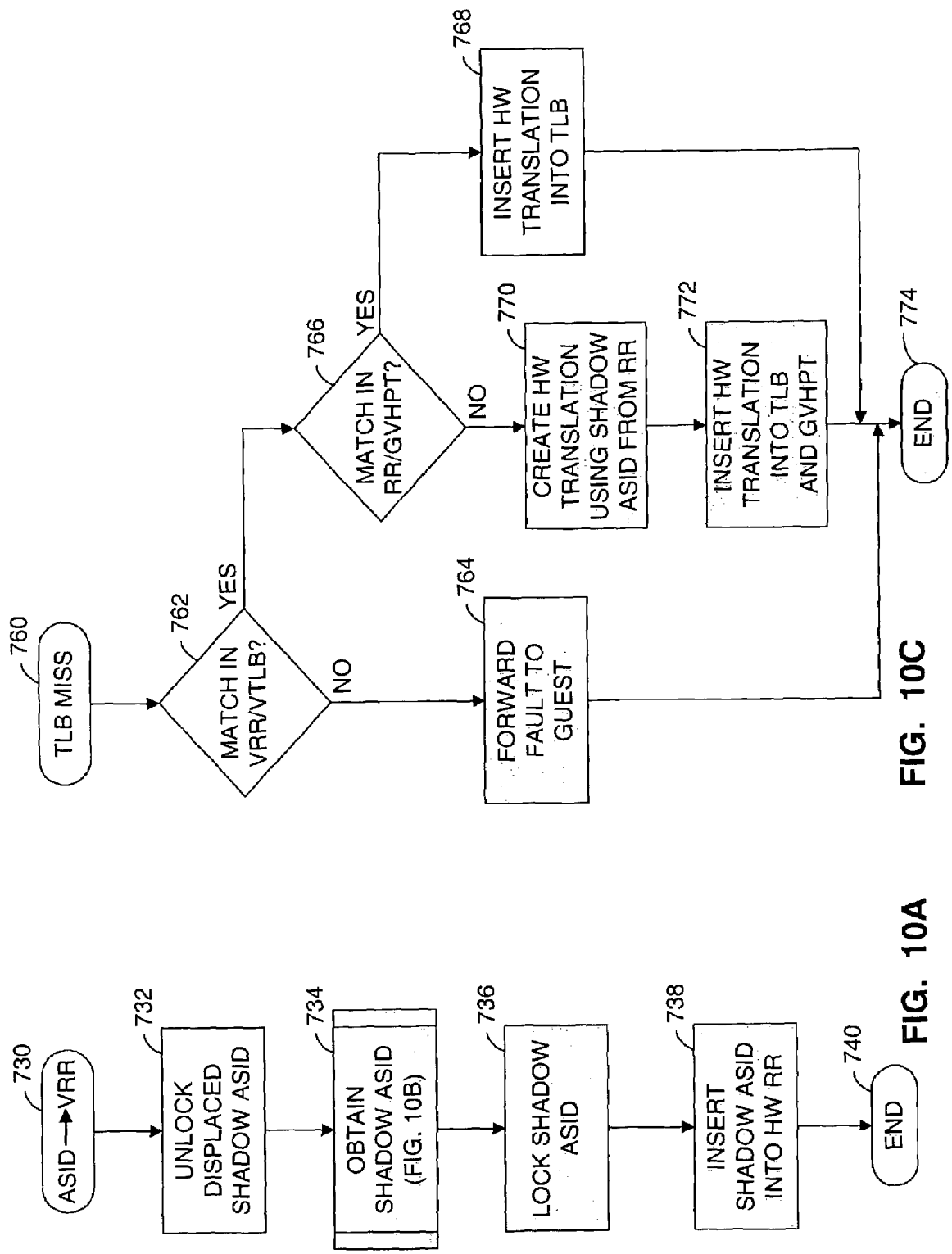

| ASID TABLE | | | | |
|---|---|---|---|---|
| VM ID | VCPU ID | VASID | CPU ID | SASID |
| 300M | 302M | 27 | 102A | 27 |
| 300P | 302P | 13 | 102B | 42 |
| 300M | 302N | 27 | 102A | 50 |
| 300M | 302N | 7 | 102B | 13 |
| ⋮ | ⋮ | ⋮ | ⋮ | ⋮ |
| 300M | 302N | 42 | 102A | 42 |

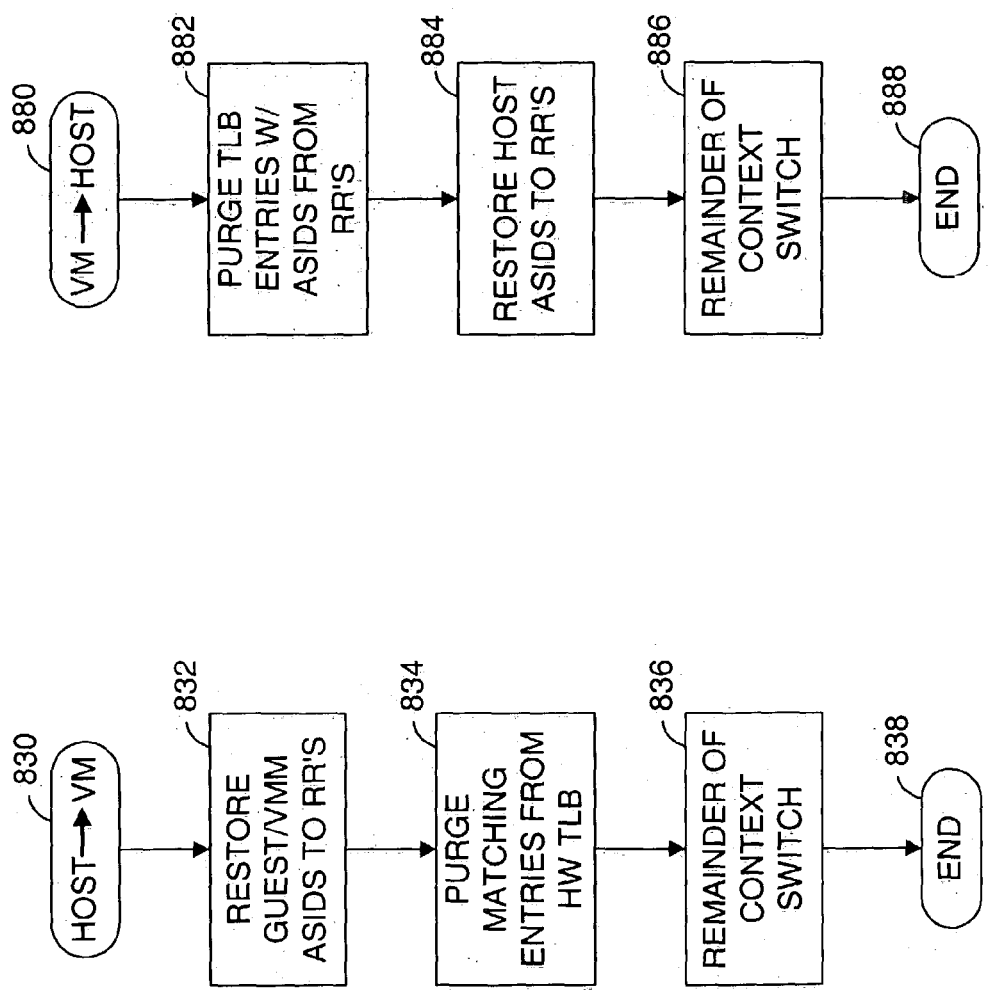

VIRTUALIZATION SYSTEM FOR COMPUTERS THAT USE ADDRESS SPACE INDENTIFIERS

BACKGROUND OF THE INVENTION

1. Field of the Invention

This invention relates to the field of computer virtualization, that is, to systems and methods for implementing computers as software running on an underlying host hardware platform.

2. Description of the Related Art

The preferred embodiment of the invention is described relative to a virtual memory system for a virtual computer system. Consequently, this description begins with an introduction to virtual computing and virtual memory systems.

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

EXAMPLE OF A VIRTUALIZED SYSTEM

FIG. 1 illustrates the main components of a system that supports a virtual machine as implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit MMU 108. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system (OS) 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM), 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 312 includes a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 will be a software abstraction of physical components, the VM's system software 312 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity, to illustrate the structure and operation of that single VM; in many installations, there will be more than one VM installed to run on the common hardware platform; all will have essentially the same general structure, although the individual components need not be identical. In fact, installations involving multiple VMs are of particular relevance to this invention.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

FIG. 2 illustrates yet another implementation, in which the kernel 700 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

MEMORY MAPPING AND ADDRESS TERMINOLOGY

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 245 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 108. The TLB contains, among other information, VPN-to-PPN mapping entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. After the TLB miss fault is handled, the same memory access is attempted again, and this time, the required VPN-to-PPN mapping is found in the TLB. The OS thus specifies the mapping, but the hardware MMU 108 usually actually performs the conversion of one type of page number to the other. Below, for the sake of simplicity, when it is stated that a software module "maps" page numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 320 translates the guest VPN (GVPN) into a corresponding guest PPN (GPPN)

in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 320 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 360 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 200.

As mentioned above, virtual computer systems may allow multiple VMs to run on a single host system, which may lead to various advantages over other computer systems, such as better utilization of hardware resources and isolation of the VMs from one another. Each VM operates independently, with its own guest OS and applications, as if it were a separate hardware computer. In particular, each VM is allocated its own physical memory and has its own virtual address space. Each guest OS 320 is free to use its own virtual address space in any manner, without any restrictions from the other VMs. As a result, there is likely to be substantial duplication of virtual addresses between the multiple VMs.

Now each VM has its own page tables and virtual TLB, which the guest OS loads with its own virtual to physical address translations, which are translations from the guest virtual address space (GVPNs) to what the guest OS perceives to be its own physical memory (GPPNs). In response to insertions of address translations into a virtual TLB, the VMM typically loads corresponding address translations into the hardware TLB, which are translations from the guest virtual address space (GVPNs) to the actual hardware memory that has been allocated for use by the corresponding VM (PPNs). As mentioned above, the multiple guest OSs may use the same virtual addresses, which means that multiple virtual TLBs may contain translations that have the same GVPNs. However, the corresponding address translations in the hardware TLB will generally have different PPNs because the different VMs are typically allocated different physical memory.

Suppose that a first VM is executing and software within the VM attempts a memory access to a first virtual address. In response to the attempted memory access, the MMU 108 checks the hardware TLB for a translation for which the virtual page number matches the first virtual address. Suppose that a second VM had been executing recently and had used the same first virtual address in one of its memory accesses, so that the hardware TLB still contains a translation from the second VM for the first virtual address. Suppose further that the MMU encounters and uses this address translation from the second VM. The PPN of the encountered address translation points to a memory page that belongs to the second VM, and not the first VM. Using the address translation from the second VM will likely cause adverse consequences for either the first VM or the second VM, or both.

As a result, when execution switches from one VM to another, address translations for the outgoing VM may need to be purged from the hardware TLB to avoid any such conflicts with the virtual addressing of the incoming VM. Rather than keeping track of which TLB entries need to be purged when switching between multiple VMs, a flush of the entire TLB is generally performed.

Now, suppose two different VMs have active processes that require CPU processing time. Execution will typically switch back and forth between these two VMs in the same manner as multiple processes are run in a conventional multiprocessing computer system. Each time execution switches between the two VMs, the TLB is flushed, or specific TLB entries are purged. Each time a VM begins executing again, some or all of the address translations that were in the TLB the last time the VM was executing may now be missing because of an intervening purge of the TLB in preparation for allowing another VM to execute. When memory accesses are attempted in the newly executing VM, TLB miss faults will generally occur until the TLB is substantially reloaded with translations for the new VM again. In many implementations, switching between multiple VMs and purging TLB entries for the outgoing VMs leads to a large number of TLB miss faults. Responding to all of those TLB miss faults consumes substantial processing resources.

What is needed therefore is a mechanism by which TLB purges may be avoided when switching between multiple VMs in a virtual computing system. Such a mechanism is needed, in particular, for computer systems that use address space identifiers (ASIDs). This invention provides such a mechanism.

SUMMARY OF THE INVENTION

A first general embodiment of the invention involves a method of managing address space identifiers (ASIDs) in a virtual computer system. The virtual computer system comprises a physical hardware system that uses ASIDs. The physical hardware system supports a virtual machine that also uses ASIDs. The virtual computer system further comprises one or more other software entities. The method comprises allowing guest ASIDs to be selected and used for address translations within the virtual machine independently of the one or more other software entities; determining which ASIDs are in use by the one or more other software entities; allocating a shadow ASID for each guest ASID used within the virtual machine, each shadow ASID being unique from all other allocated shadow ASIDs and from the ASIDs that are in use by the one or more other software entities; and using the allocated shadow ASIDs within the physical hardware system for address translations related to the virtual machine.

The first general embodiment may further be limited to a method in which one of the other software entities is a second virtual machine. Also, the step of determining which ASIDs are in use by the one or more other software entities may be accomplished by maintaining and consulting an ASID table listing ASIDs that have been used in the virtual computer system. Also, the step of allocating a unique shadow ASID may sometimes require that a previously allocated shadow ASID be deallocated. Also, the deallocation of a previously allocated shadow ASID may sometimes require that one or more entries be purged from a hardware TLB. Also, a shadow ASID may be allocated to a guest ASID in response to an address translation being inserted into a virtual TLB, the address translation including the guest ASID. Finally, an allocated shadow ASID may be used within the physical hardware system by inserting an address translation into a hardware TLB, the address translation including the allocated shadow ASID.

A second general embodiment of the invention involves a method of managing address space identifiers (ASIDs) in a virtual computer system, where the virtual computer system comprises a physical hardware system supporting a plurality of virtual machines. The method comprises allowing each virtual machine to use its own guest ASIDs, independently of the other virtual machines, for address translations within the respective virtual machine; maintaining a record of allocations of shadow ASIDs to the guest ASIDs of the plurality of virtual machines; and for a new guest ASID allocating a new shadow ASID for use in corresponding address translations within the physical hardware system by consulting the record of allocations and performing the following steps: if there are one or more shadow ASIDs that are not allocated to guest ASIDs, allocating one such shadow ASID to the new guest ASID; otherwise, if there are one or more shadow ASIDs that are not currently being used in any address translations in a hardware TLB, deallocating one such shadow ASID and reallocating the deallocated shadow ASID to the new guest ASID; or otherwise, selecting a shadow ASID that is currently being used in one or more address translations in the hardware TLB, purging said one or more address translations from the hardware TLB, deallocating the selected shadow ASID and reallocating the selected shadow ASID to the new guest ASID.

The second general embodiment may be further limited to a method comprising, in response to a current guest ASID being used in an address translation being inserted into a virtual TLB of a virtual machine, consulting the record of allocations and, if a shadow ASID has already been allocated for the current guest ASID, using the already allocated shadow ASID in a corresponding address translation and inserting the corresponding address translation into the hardware TLB, otherwise performing the step of allocating a new shadow ASID, with the current guest ASID being the new guest ASID, and using the new shadow ASID in the corresponding address translation and inserting the corresponding address translation into the hardware TLB. The method may further comprise, if a shadow ASID is deallocated, purging all entries in a page table that contain the deallocated shadow ASID before reallocating the deallocated shadow ASID. Also, the method may further comprise, if all shadow ASIDs are allocated to guest ASIDs, but there are one or more shadow ASIDs that are not currently being used in any address translations in the hardware TLB, selecting an unused shadow ASID for deallocation and reallocation that was previously allocated to a guest ASID from the same virtual machine as the new guest ASID, if there are any such shadow ASIDs. The method may be further limited so that the step of maintaining a record of allocations involves maintaining an ASID table comprising multiple entries, with each entry including a source ID value, a source ASID value and a shadow ASID value. The method may further be limited so that, if a shadow ASID is deallocated and reallocated, the ASID table is modified to indicate that the reallocated shadow ASID is allocated to the new guest ASID and source ID, instead of to the guest ASID and source ID to which the shadow ASID was previously allocated.

A third general embodiment of the invention involves a computer program embodied in a tangible medium, the computer program being executable in a virtual computer system using address space identifiers (ASIDs) in both the physical architecture and the virtualized architecture. The virtual computer system supports a plurality of virtual machines, each of the virtual machines using one or more guest ASIDs within the virtualized architecture. The computer program comprises one or more ASID managers for allocating a unique shadow ASID for each guest ASID that is in use in the virtual machines, the unique shadow ASIDs being used within the physical architecture; and an ASID table for maintaining information regarding the allocations between shadow ASIDs and guest ASIDs.

The third general embodiment may be further limited so that the ASID table comprises multiple entries, with each entry comprising a source ID value, a source ASID value and a shadow ASID value. Also, the ASID manager may allocate a shadow ASID for a guest ASID by performing the following steps: consulting the ASID table for an entry for which the source ID and source ASID match the guest ASID and the virtual machine in which the guest ASID is used; and if there are one or more shadow ASIDs that are not allocated to guest ASIDs, allocating one such shadow ASID to the guest ASID; otherwise, if there are one or more shadow ASIDs that are not currently being used in any address translations in a hardware TLB, deallocating one such shadow ASID and reallocating the deallocated shadow ASID to the guest ASID; or otherwise, selecting a shadow ASID that is currently being used in one or more address translations in the hardware TLB, purging said one or more address translations from the hardware TLB, deallocating the selected shadow ASID and reallocating the selected shadow ASID to the guest ASID. Also, if a shadow ASID is deallocated, the ASID manager may purge all entries in a page table that contain the deallocated shadow ASID before reallocating the deallocated shadow ASID. Also, if a shadow ASID is deallocated and reallocated, the ASID manager may modify the ASID table to indicate that the reallocated shadow ASID is now allocated to the guest ASID. The ASID manager and the ASID table may also form part of a kernel that supports multiple virtual machine monitors, with each virtual machine monitor supporting one or more virtual machines. Also, the virtual computer system may comprise multiple virtual machine monitors, with each virtual machine monitor supporting one or more virtual machines, and the computer program may comprise an ASID manager for each of the multiple virtual machine monitors, with each ASID manager allocating shadow ASIDs for the virtual machines supported by the respective virtual machine monitors, and with the multiple ASID managers sharing access to the ASID table.

BRIEF DESCRIPTION OF THE DRAWINGS

FIG. 10A is a flow chart illustrating a method that is performed by a VMM and kernel in one embodiment of the invention, in response to an insertion of a guest ASID into a virtual region register.

FIG. 10C is a flow chart illustrating a method that is performed by a VMM in one embodiment of the invention, in response to a TLB miss fault.

FIG. 15A is a flow chart illustrating a method that is performed in another embodiment of the invention involving a host operating system ("the hosted embodiment"), when a context switch is made from the host environment to a virtual machine environment.

FIG. 15C is a flow chart illustrating a method that is performed in the hosted embodiment, when a context switch is made from a virtual machine environment to the host environment.

DETAILED DESCRIPTION

Figure 1:
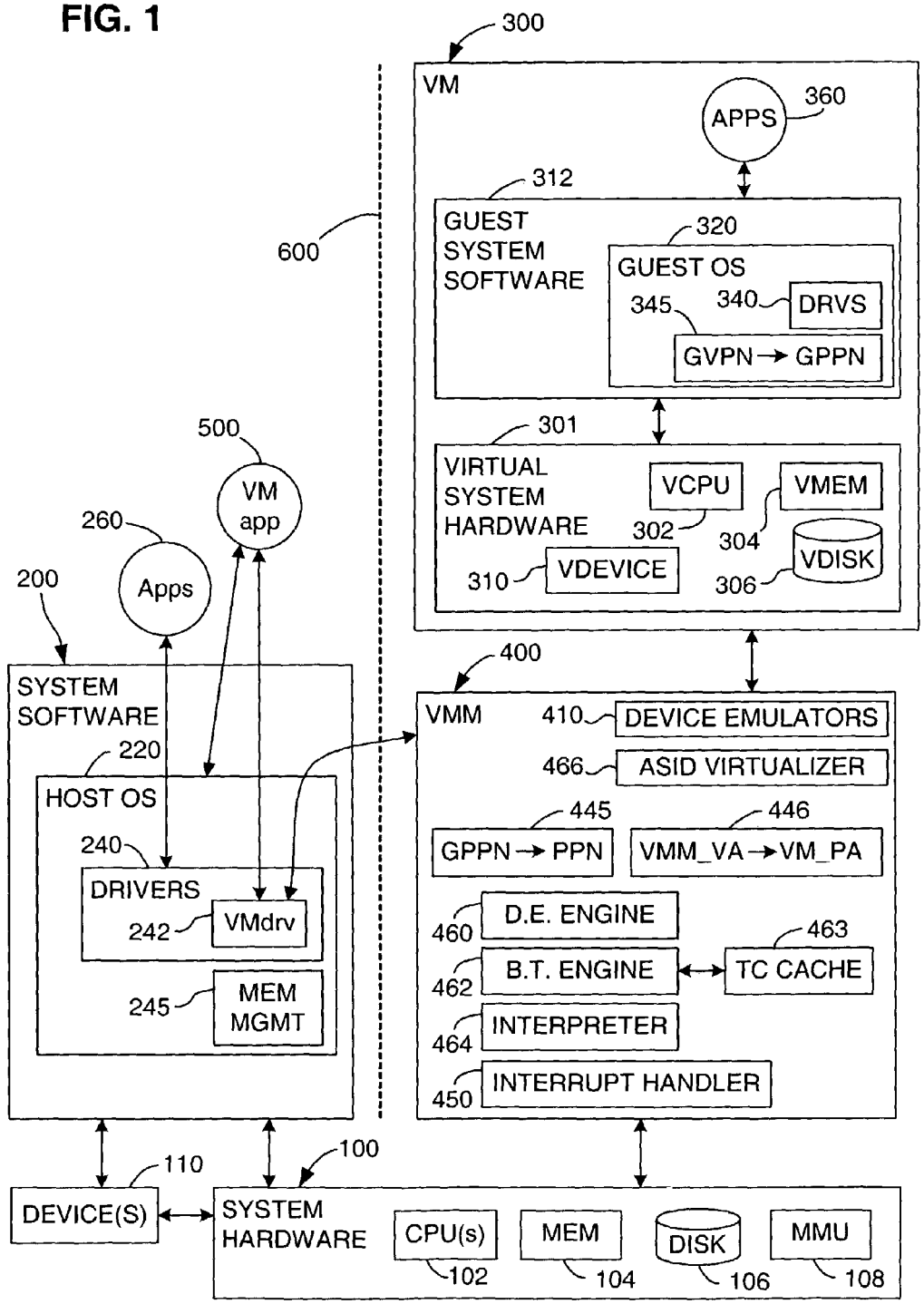
FIG. 1 illustrates a virtual computer system installed on a host platform, with a virtual machine monitor (VMM) at the same system level as the host operating system.

The invention may be implemented in any virtual computer system involving the use of ASIDs. This detailed description focuses on an exemplary embodiment in which a specific virtual computer system supports multiple VMs on a hardware system based on the IA-64 architecture, where the VMs are also based on the IA-64 architecture. The invention may also be implemented, however, in other systems involving different physical hardware architectures, as well as different virtualized architectures, including cross-platform virtual computer systems. In particular, the invention may be implemented in virtual computer systems in which the hardware system uses ASIDs, but one or more VMs, including possibly all VMs, do not use ASIDs. The hardware system in the exemplary embodiment has only a single processor, although the invention may also be implemented in multiprocessor systems, such as the alternative embodiments illustrated herein. The described embodiment uses a pair of VMMs to support a pair of VMs, with a kernel providing an interface with the system hardware, although various other arrangements are also possible. For example, the invention may also be implemented in a virtual system in which a host OS is used instead of a kernel, or in a system in which a single VMM supports multiple VMs. The invention is particularly advantageous in systems involving multiple VMs, but, as described below, the invention may also be implemented in a system with just a single VM.

In the exemplary embodiment, the virtual computer system provides a virtual TLB within each VM. The guest software in a VM may insert address translations into the virtual TLB for that VM. Each address translation inserted into the virtual TLB of each of the VMs will include a guest ASID. There is no coordination among the multiple VMs in selecting guest ASIDs, so there is likely to be duplication of guest ASIDs among the multiple VMs, especially if multiple VMs are running the same guest OS, because the multiple instances of the same OS would generally use the same algorithm for choosing guest ASIDs.

When execution within the hardware system switches from a first VM to a second VM, a context switch is performed. If the guest ASIDs were loaded directly into the hardware TLB and if the first VM and the second VM use any of the same ASIDs, then any TLB entries containing the common ASIDs would have to be purged from the hardware TLB. Also, if the second VM wishes to use an ASID, after it has started executing, that has already been used by the first VM, then any TLB entries inserted by the first VM that contain that ASID must then be purged from the hardware TLB before the second VM can begin to use the common ASID. Thus, TLB entries using common ASIDs must be purged from the TLB upon a second VM using a common ASID for the first time. These entries could be purged individually or the entire contents of the TLB could be flushed. Purging TLB entries typically leads to an increased number of TLB miss faults, though, which consumes substantial processing resources. If the TLB entries had not been purged and had not been overwritten by intervening translation insertions, and execution switched back to the original VM, the TLB entries for the original VM could be used again without any intervening TLB miss faults.

The invention does not directly load the guest ASIDs into the hardware TLB, however. Instead, the invention assigns a shadow ASID to each guest ASID, and uses the shadow ASID in address translations in the hardware TLB that correspond to the address translations in the virtual TLBs of the multiple VMs. In the preferred embodiment, each shadow ASID is unique, even if multiple VMs use the same guest ASID. Using unique shadow ASIDs generally allows execution to switch from one VM to another, without having to purge any TLB entries.

IA-64 Memory Architecture

To better explain the preferred embodiment of the invention, a brief description is provided of the main addressing conventions of the Intel IA-64 architecture. One distinction between this architecture and the 32-bit, IA-32 architecture is that the IA-64 memory space is non-segmented, but is divided into regions. Note that the term "segment" is also used in descriptions of the Intel IA-64, but not in the same sense as in segmented architectures. In a segmented memory architecture such as the IA-32, memory access is controlled using segment registers and various tables of segment "descriptors" that may be loaded into the registers. The main tables are the Local Descriptor Table (LDT) and the Global Descriptor Table (GDT). A VM running on this architecture will maintain similar tables for its virtual processor; thus, the VM will have a virtual LDT and a virtual GDT. The VMM may maintain shadow copies of these virtual descriptor tables to help ensure coherency and to increase security. Segmentation in the IA-32 (or earlier) context is thus related to hardware segment registers.

The Intel "IA-64 Software Conventions and Runtime Architecture Guide," September 2000, defines the difference between segments and regions in the IA-64 context:

Segment: An area of memory that has specific attributes and behaves as a fixed unit at runtime. All items within a segment have a fixed address relationship to one another at execution time, and have a common set of attributes. Items in different segments do not necessarily bear this relationship, and an application may not depend on one . . . . The use of this term is not related to the concept of a segment in the IA-32 architecture, nor is it directly related to the concept of a segment in an object file.

Region: The IA-64 architecture divides the address space into four or eight regions. In general, the runtime architecture is independent of which segments are assigned to which regions.

The IA-64 system has the property that it can map virtual memory regions differently, and can change the mapping, but the mapping granularity is always a whole region.

By definition, if addresses are 64 bits wide, then there are $2^{64}$ possible addresses, which comprise the entire theoretical virtual address space of the memory. Actually, using the region registers described below, there are $2^{24}$ different regions, with each region having $2^{61}$ possible addresses. However, only $2^{64}$ addresses may be used at any time. No hardware memory holds even $2^{64}$ bytes (words, etc.), however, so the host OS and/or hardware memory management mechanisms map whatever subset of the $2^{64}$ possible memory addresses that is allocated for use by applications to physical memory.

Figure 3:
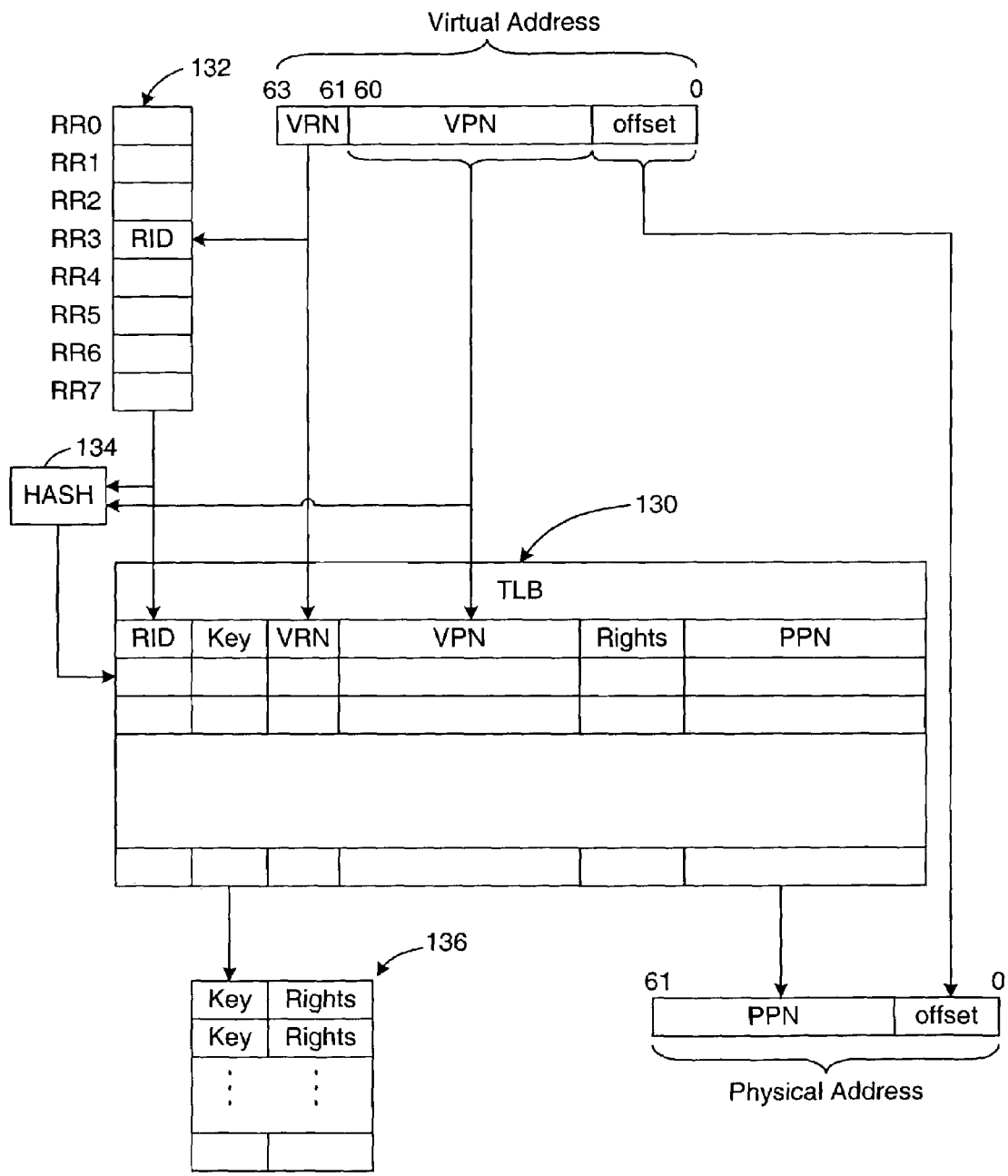
FIG. 3 illustrates various structures used to translate virtual addresses into physical addresses in the Intel IA-64 architecture.

FIG. 3, which is adapted from Intel Corp.'s "IA-64 Architecture Software Developer's Manual," Vol. 2, "Addressing and Protection," Rev. 1.0, January 2000, illustrates how virtual addresses are translated into physical addresses in a standard IA-64 system: Each virtual address includes a virtual region number (VRN), indicated using the three MSBs of the address, a virtual page number (VPN) and an offset. The VRN is used both to search a corresponding field in the entries of a translation lookaside buffer (TLB) 130 and also to point into a set (RR0, RR1, . . . , RR7) of region registers 132, each of which contains a 24-bit region identifier (RID). The RID is an "address space identifier" (ASID), as that term is used herein. The meaning of an ASID is well known in the art. Generally, a range of virtual addresses may be referred to as an address space, and an ASID is a means for distinguishing among multiple address spaces.

To translate a virtual address into a physical address, the TLB 130 matches both the RID obtained from the RR indicated by the VRN and the VPN with entries in the TLB. If a matching entry is found, the entry's physical page number (PPN) is concatenated with the page offset of the virtual address to form the physical address. Besides fields used for virtual address translation, the TLB entry also contains access rights and a 24-bit protection key, which is matched against all protection key registers 136. The memory address translation succeeds only if both the access rights from the TLB entry allow the access and a matching protection key is found with the required permission bits set.

If an address lookup fails in the TLB, then a conventional virtual hash page table VHPT walker, if enabled, searches for the translation in a virtual hash page table 134 (VHPT). If a matching entry is found, then the translation is inserted into the TLB and the physical address is obtained. A page table address (PTA) register (not shown, for simplicity, but well known) controls the behavior of the VHPT walker: The PTA includes parameters that contain information (PTA.base) for creating the VHPT base address, for determining whether the VHPT walker is enabled (PTA.ve), and for determining whether the VHPT is in short format or long format (PTA.vf). There is also a bit in each entry of the region registers 132 that indicates whether the VHPT walker is enabled for the particular region. More detailed information about the PTA's structure and function is available from publicly available manuals from Intel Corp. If a matching entry is not found in either the TLB or the VHPT, a TLB miss fault issues. An OS typically responds to a TLB miss fault, often by placing the required translation in the TLB.

VM and VMM Virtual Addressing

Figure 4:
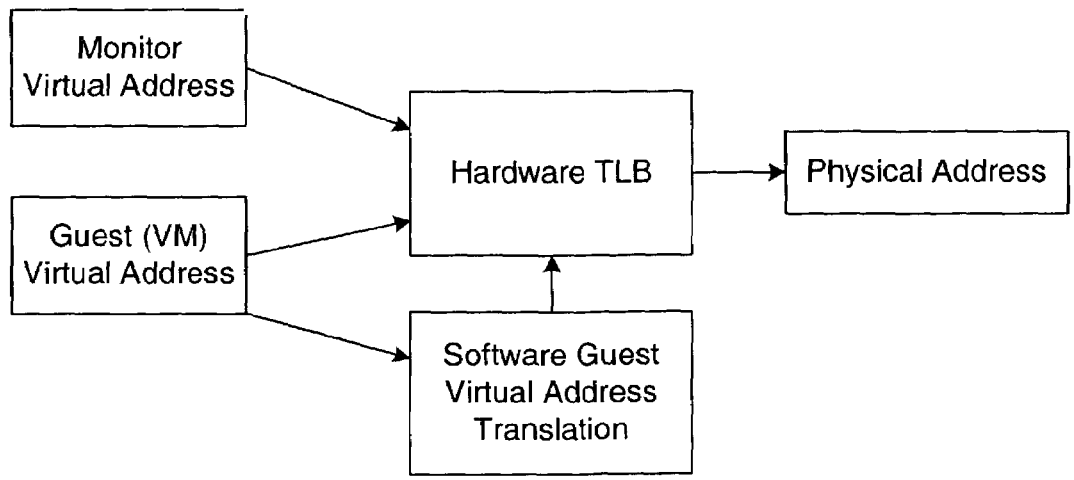
FIG. 4 illustrates memory access by a virtual machine (VM) and VMM.

As described above, this detailed description focuses on an exemplary embodiment of the invention involving multiple VMs. However, the following discussion is limited to a single VM to simplify the explanation of VM and VMM addressing in a virtual computer system. FIG. 4 illustrates how the VMM and VM access memory from the perspective of the host OS. Note that the host OS views the addresses of the VMM and VM as "virtual" addresses, which are converted into "physical" addresses, following conventional terminology. As is mentioned above, virtualization introduces an additional level of addressing indirection, such that the "physical" addresses (GPAs) issued by the VM guest must be converted into hardware addresses (PAs). In virtualized systems in which the VMM is at the same system level as the host OS, the VMM itself can perform virtual-to-physical address translation or address directly the hardware structures, such as the TLB, used to translate addresses.

As FIG. 4 shows, when an instruction in the monitor virtual address space accesses guest memory, the hardware must get the physical (hardware) address for the instruction and the physical (hardware) address of the guest memory. This is accomplished by translating the monitor and guest virtual addresses into their corresponding physical addresses. Thus, the hardware must have concurrent access to translations from two distinct address spaces.

Figure 5:
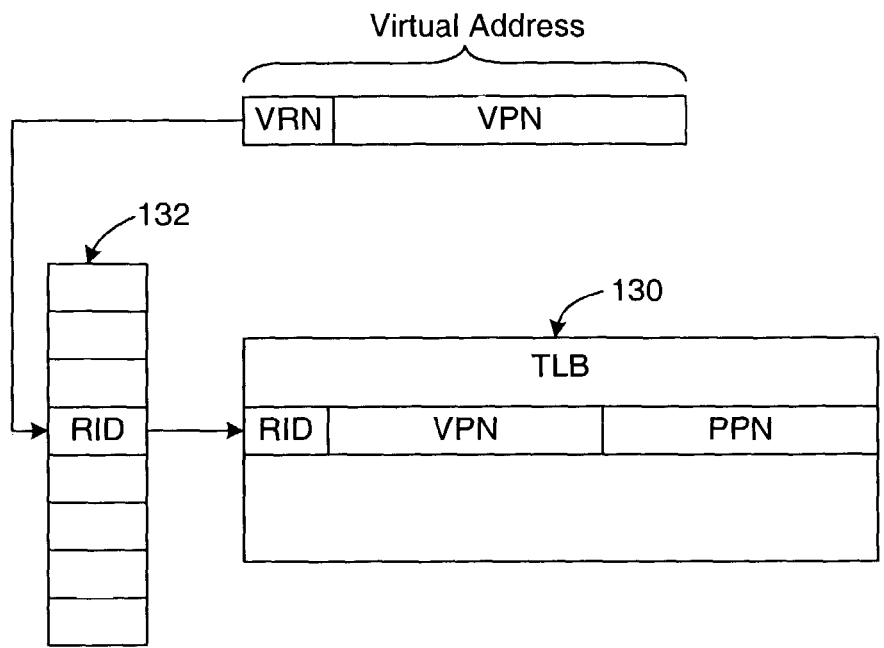
FIG. 5 is a simplified representation of the features of FIG. 3 related to the invention.

FIG. 5 is a simplified version of FIG. 3 that shows the features of virtual address space translation used in the IA-64 architecture that are most relevant to the invention: The VRN of the virtual address is used to select one of the region registers 132, in particular, the register RRn where n=VRN. The region ID (RID) in the selected region register (RR (VRN)) along with the VPN is then used to search the TLB 130 to find the corresponding PPN. (The offset in the physical address will be the same as in the virtual address.) The RID in RR(VRN) must match that in the hardware TLB. In one embodiment of the invention, a special RID is assigned to the monitor address space (VMMRID). If RR(VRN) does not contain the monitor RID, then no monitor entries in the hardware TLB will match the virtual address.

Regions and Execution Modes

As mentioned above, the address space of an IA-64 system allows for separate addressing of $2^{64}$ different bytes at any time, since each address contains 64 bits. To manage this address space, the uppermost significant three bits of each address are used to form the VRN, which designates a $2^{61}$-byte "region."

The monitor RID is loaded into one of the region registers, while the other seven region registers may be loaded with RIDs for use by the VM. Since the monitor occupies one region, the VM can freely access the other seven regions, which comprise $7*2^{61}$ bytes of memory space. Although this memory space is more than big enough to contain any code and data the VM might need, the VM may still attempt to access the address space that is assigned to the VMM. This must be prevented. One way to prevent such "unauthorized" and potentially dangerous access is by using a region relocation procedure described in co-pending U.S. patent application Ser. No. 10/263,245, "Virtualization System for Computers with a Region-Based Memory Architecture", which is hereby incorporated by reference herein. In very simple terms, the VMM does not allow any VM to use the dedicated monitor RID. The VMM loads the monitor RID into a first one of the region registers. If the VM attempts to use the first region register, which contains the monitor RID, the VMM moves the monitor RIb into a different one of the region registers and loads an appropriate RID into the first region register, for use by the VM. The VMM then allows the attempted VM memory access, using the first region register, to complete. In this manner, the VMM is relocated in the virtual address space as needed so as to allow for as much direct execution of VM instructions a's possible. RIDs are described in greater detail below. This region relocation procedure only works, however, if it is not possible for the VM to perform a single operation that requires simultaneous access to all of the region registers, which is the case for the IA-64 architecture.

The VM/VMM pair executes in different modes, each of which involves' access to either the VM's memory region, the VMM's current memory region, or both. The three main execution modes are referred to here as the direct execution mode, the binary translation mode, and the monitor mode. If an external interrupt or a fault occurs when the VMM is executing, it preferably saves the interrupted context and enters the monitor mode, in which it will decide to return to the host OS kernel or resume in binary translation mode or direct execution. The interrupt handier is responsible for swapping the register state and the page table address, so it may be considered to be an additional execution mode.

Figure 6:
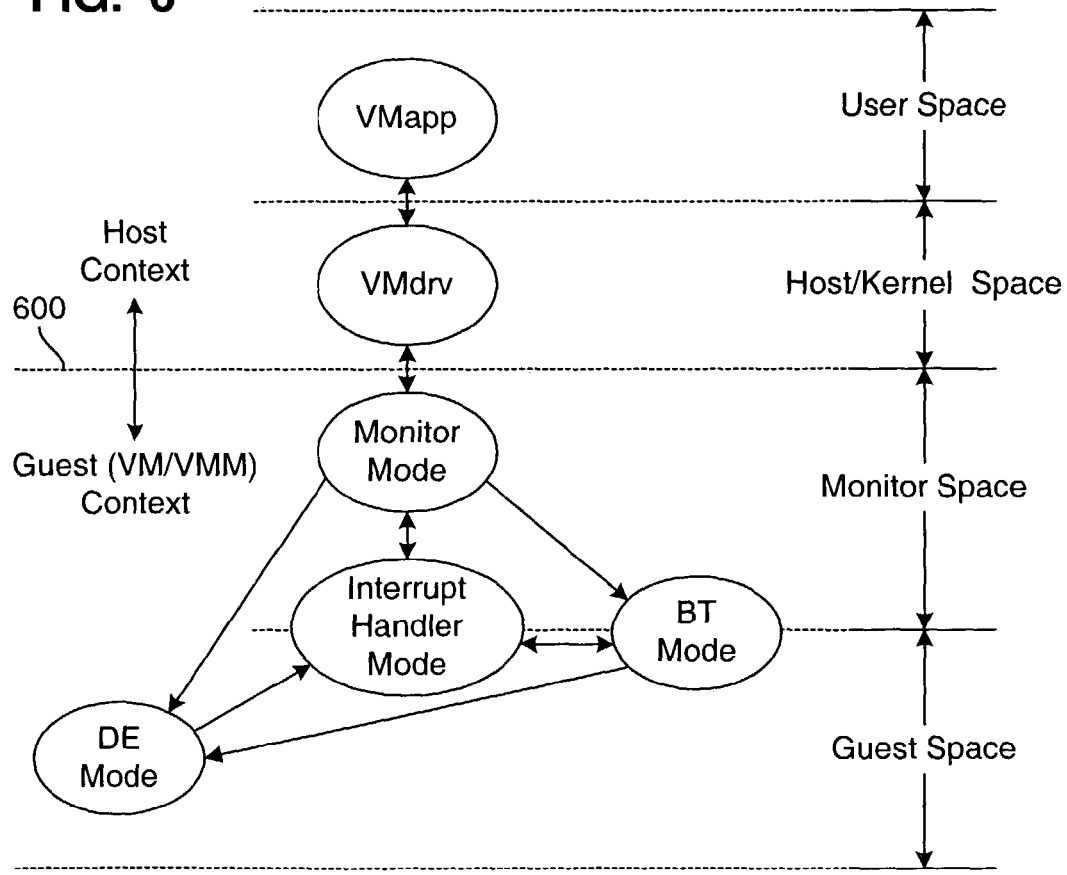
FIG. 6 illustrates state transitions and control flow for a VMM, as well as communication paths between the VMM, on the one hand, and a driver and a user-level application used to communicate with a host OS on the other hand as found in one embodiment of the invention.

FIG. 6 illustrates the state transitions of the VMM as well as communication paths with VMdrv and VMapp. The figure also shows the parts of the total memory space in which the different states operate. The contextual line 600 (see FIG. 1) between the host and guest contexts or "worlds" is also shown. As the figure shows, the application VMapp operates in the host/user-level address space, the driver VMdrv is located in the host/kernel space, execution in the monitor mode takes place within the monitor (VMM) space, direct execution takes place in the guest (VM) space, and binary translation and interrupt handling generally require access to both the VMM and the VM spaces.

VMM Memory Space

The VMM runs in either its own VMM memory space, or in the VM's guest space, and often in both. In the monitor space, the monitor's code and data are directly addressable. The monitor space also contains an area shared with VMapp, as well as the guest physical memory, which, in IA-64 systems, the VMM can access directly.

Figure 7:
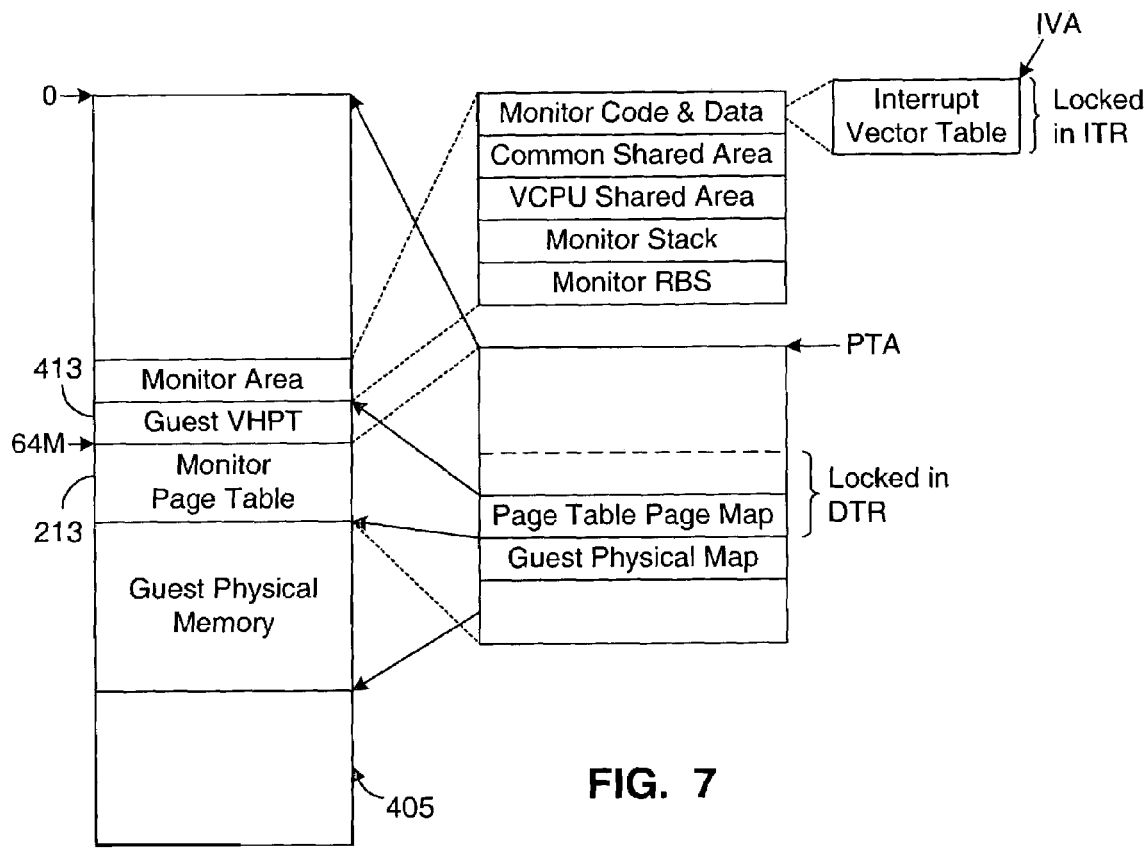
FIG. 7 illustrates one example of the address space of a VMM used in one embodiment of the invention.

FIG. 7 illustrates the VMM address space 405, which is located in a single virtual address region and is addressed by a short-format Virtual Hash Page Table (VHPT, also referred to here as the VMM or monitor page table) 213. The monitor's virtual address space is divided into the monitor area, a guest VHPT (GVHPT, also referred to here as the guest page table)

413, the monitor page table 213 and guest physical memory areas. FIG. 7 also shows more detailed breakdowns of the monitor area and monitor page table 213.

The monitor area is accessed mainly when the VMM runs in monitor mode, that is, when the code defining the VMM is being executed. It is therefore further divided into code and data, a common shared area, a VCPU shared area, a stack, and a register backing store (RBS). The interrupt vector table (IVT) is a section of the monitor code, which is pointed to by the hardware interruption vector address (IVA) and is always locked in an instruction translation register (ITR) of the TLB when the VMM is running.

The GVHPT is a long-format VHPT table that serves as a second level TLB table for guest virtual address translations. When running in the direct execution mode or the binary translation mode, the hardware Page Table Address (PTA) points to the start of the GVHPT. The entries in the GVHPT are shadowed in the guest TLB and in VHPT tables created by the guest OS. In other words, entries in the GVHPT generally correspond to entries in the guest TLB and the guest OS page tables, but the entries differ in several ways to account for differences between the physical hardware setting of the GVHPT and the VM setting of the guest TLB and the guest OS page tables. For example, the GVHPT contains translations from GVPNs to PPNs, while the guest TLB and the guest OS page tables contain translations from GVPNs to GPPNs. Also, the access rights and the protection key of the translation entries (as shown in FIG. 3) may differ for various reasons, such as to enforce a stricter protection mechanism within the VM to ensure that the VM has no adverse effect on the VMM. Also, as described below, the RIDs may differ in accordance with this invention. Generally, the VMM responds to the guest OS inserting translations into the guest TLB and possibly into the guest OS page tables by creating corresponding translations and inserting them in the GVHPT.

The monitor page table maps all areas accessible to the VMM in a short-format VHPT table. When running in the monitor, the hardware PTA points to the start of the monitor page table. The page that contains translations for the monitor page table and the GVHPT is locked in a data translation register (DTR) of the hardware TLB.

The physical (machine) memory used by the guest is also represented as a continuous virtual address region in the monitor address space that maps to the conceptual guest physical memory. Guest physical memory may, in some cases, be directly accessed by adding a constant offset to the guest physical address.

The virtual system hardware 301 is assumed to have the same IA-64 architecture as the host; otherwise, direct execution will in general not be possible at all. Also, recall that the VM is intended to act as a complete hardware and software computer system. This means that the structure shown in FIG. 3 is replicated in the VM. The VM will consequently preferably have a guest TLB (or virtual TLB), protection key registers, region registers, hash table, etc., just like a "real" computer.

Physical Addressing Virtualization

As is mentioned above, the VMM (monitor) maps the guest (VM) physical memory to the host physical ("machine") memory. The VM (guest) memory is not guaranteed to map to consecutive machine memory; rather it is mapped in page sized units defined by the host OS. When the VM accesses its guest physical address (GPA), the VMM splits the GPA into a GPPN and an offset. The hardware, physical address PA is then obtained by mapping GPPN→PPN and concatenating the invariant page offset.

Explicit translation is unnecessary when the VMapp and the VMM access the VM memory space. In the VMapp, guest physical memory is allocated using standard host OS commands, so accesses to the guest physical memory can be achieved through standard host OS virtual addressing. When the guest physical memory is allocated, the VMapp determines the PPNs for the pages of physical memory that are allocated and returns these PPNs to the VMM. The guest physical memory is mapped into the virtual address space of the VMM as shown in FIG. 7. The monitor page table contains translations between the virtual address space of the VMM and the PPNs, including translations for the VMM virtual addresses that address the guest physical memory. Consequently, the VMM can access the guest physical memory using its own virtual addressing.

From the perspective of the host OS, both the VM and the VMM occupy a common virtual address space. The VM, however, acting as a "complete" computer, may have a different notion of the available virtual address space. Similarly, the VMM also has a notion of the available virtual address space that is typically broader than that of the VM's, since the VMM is aware of the VM but not vice versa.

Once a guest starts using a page of physical memory, so that there are one or more translations to the physical page in the hardware TLB 130 or the GVHPT 413, the host OS is not allowed to reuse the physical page. This is achieved by locking the machine page PPN from the host OS. Initially, no VM physical memory is locked; machine pages are locked and unlocked on demand.

EXEMPLARY EMBODIMENT

Figure 2:
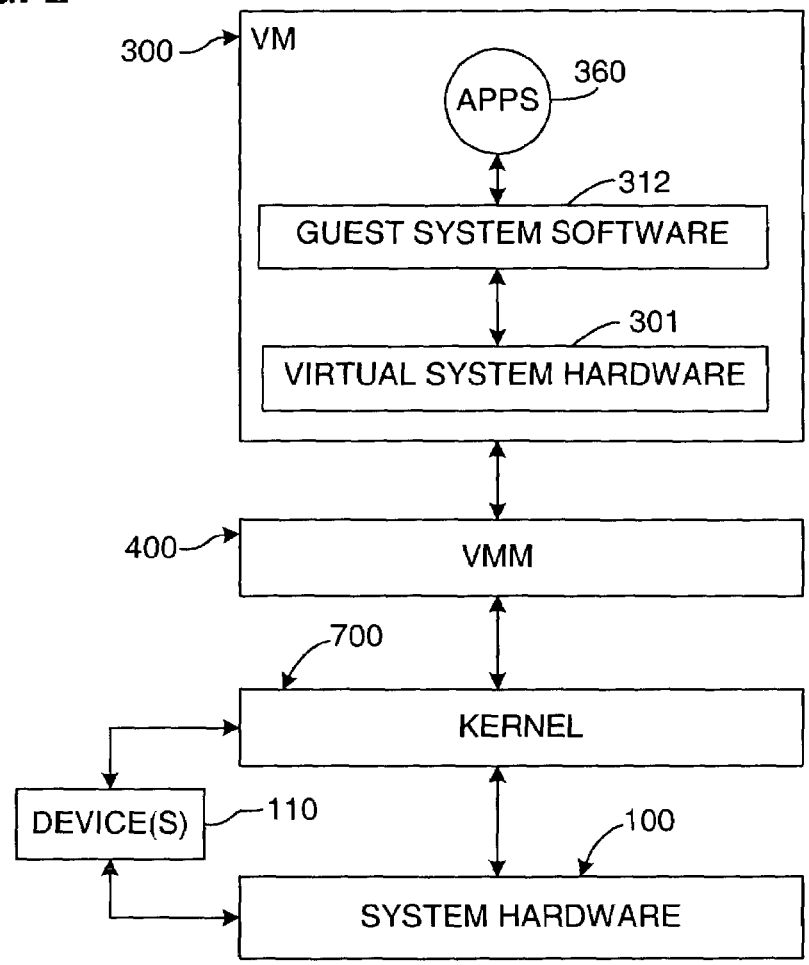
FIG. 2 illustrates an alternative configuration of a virtual computer system, which includes a kernel on which the VMM runs.
Figures 8, 9:
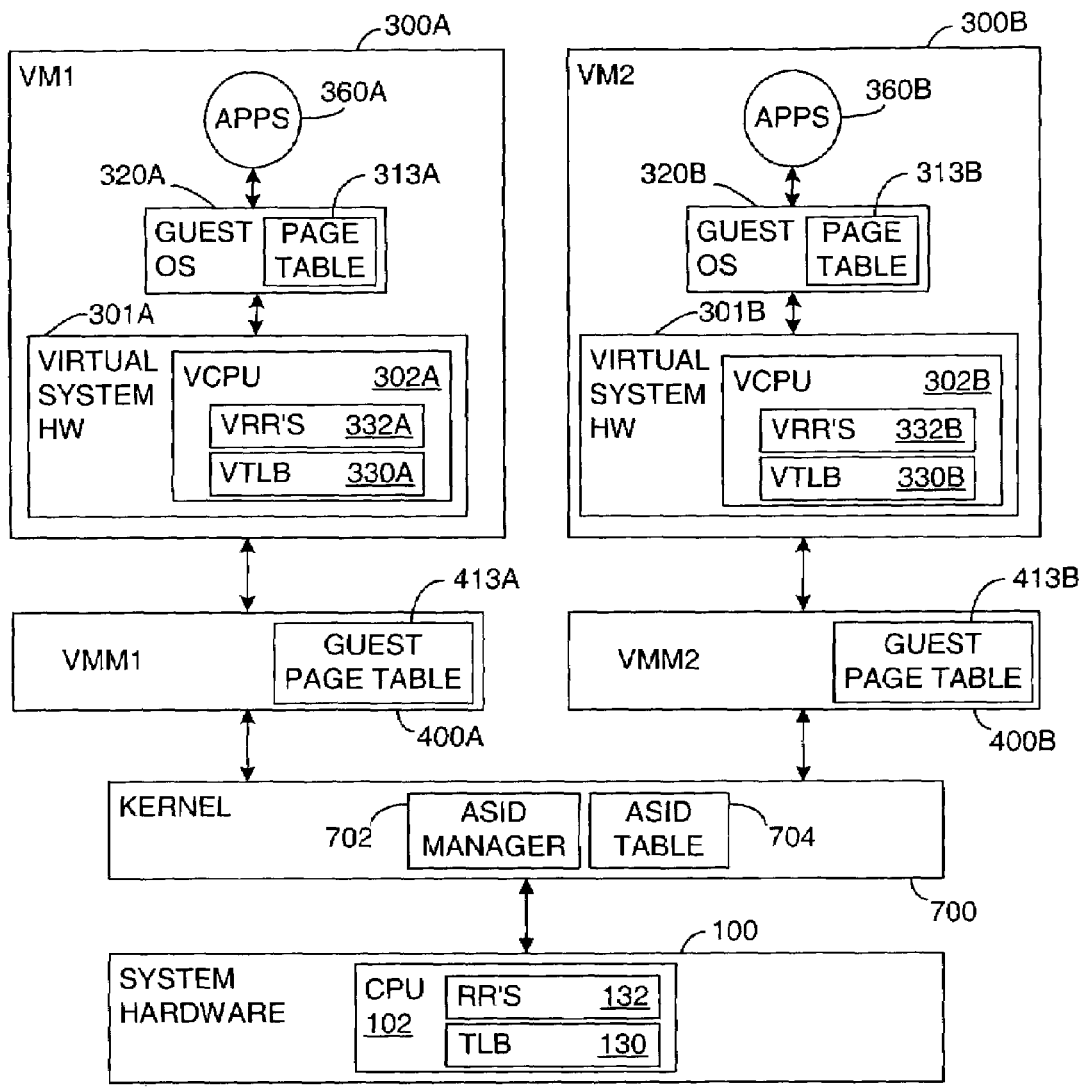
FIG. 8 illustrates a virtual computer system in which the invention may be implemented, the system including two VMMs running on a kernel, with each of the VMMs supporting a separate VM.
FIG. 9 illustrates an address space identifier (ASID) table that is used in one embodiment of the invention to maintain allocations between source ASIDs and shadow ASIDs.

FIG. 8 illustrates one specific virtual computer system in which the invention may be implemented. The system includes system hardware 100, which may be the same system hardware as illustrated in FIGS. 1 and 2. FIG. 8 illustrates the CPU 102 within the system hardware, including a set of region registers 132 and a TLB 130. The computer system also includes the kernel 700, which may be the same kernel as illustrated in FIG. 2. As illustrated in FIG. 8, the kernel includes an ASID manager 702 and an ASID table 704. The ASID table 704 is illustrated in greater detail in FIG. 9, which is described below.

FIG. 8 illustrates a first VMM, VMM1 400A, and a second VMM, VMM2 400B. Each of the VMMs, VMM1 and VMM2, may be the same as the VMM 400 of FIGS. 1 and 2. The VMM1 includes a guest page table 413A, while the VMM2 includes a guest page table 413B. The VMM1 supports a first VM, VM1 300A, while the VMM2 supports a second VM, VM2 300B. Each of the VMs, VM1 and VM2, may be the same as the VM 300 of FIGS. 1 and 2. VM1 includes a virtual system hardware 301A, a guest OS 320A and a set of applications 360A. The virtual system hardware 301A includes a virtual CPU 302A, which includes a set of virtual region registers 332A and a virtual TLB 330A. The guest OS 320A includes one or more guest OS page tables 313A. VM2 includes a virtual system hardware 301B, a guest OS 320B and a set of applications 360B. The virtual system hardware 301B includes a virtual CPU 302B, which includes a set of virtual region registers 332B and a virtual TLB 330B. The guest OS 320B includes one or more guest OS page tables 313B.

The system of FIG. 8 is shown as only having a single CPU 102 to simplify the following description of the invention. To further simplify this description, suppose that the CPU 102 is a basic microprocessor, with no hyper-threading capabilities. In this exemplary embodiment, the CPU 102 and the virtual CPUs 302A and 302B are based on the IA-64 architecture. The kernel 700, the VMMs 400A and 400B and the VMs 300A and 300B are all software units comprising instructions that are executed on the CPU 102. The VMs include the guest OSs and the guest applications. The guest OSs and the guest applications will be referred to collectively as guest software.

Because there is only one CPU, with no hyper-threading capabilities, only one software thread can be executing on the CPU at any particular instant. Thus, for example, at a particular instant, an application 360B in the VM2 may be executing, the guest OS 320A in the VM1 may be executing, the VMM2 may be executing in support of the VM2, or the kernel may be executing in support of either the VM1 or the VM2. Effectively, only one VM may be active at a particular instant, whether the activity is in the form of the execution of guest instructions within a VM or the execution of instructions within either a VMM or the kernel in support of one of those VMs. However, the other VM may also be active in a more general sense, meaning that the other VM has at least one process that is waiting for a chance to be executed. Hereafter, a VM will be said to be "executing" if instructions within the VM are currently being executed or if instructions within a VMM or the kernel are currently being executed in support of the VM. A VM will be said to be "active" if it is currently executing or waiting to be executed. Thus, only one VM can be executing at a particular instant, but either or both VMs can be active at a given time.

Each of the guest OSs 320A and 320B operates on the respective VMs 300A and 300B just as if the VM were a "real" computer. Typically, a guest OS creates one or more page tables 313A, 313B containing virtual to physical address translations within the VM (GVPN to GPPN). Some of these address translations, which will be referred to as guest translations, are subsequently inserted into the corresponding VTLB 330A, 330B, often in response to a TLB miss fault that is passed from a VMM to the respective guest OS. Each of the translations includes an RID, according to the IA-64 architecture. RIDs are also loaded into the VRRs 332A, 332B in a conventional manner. The RIDs used in the guest translations and in the VRRs will be referred to as guest RIDs or, in a more general sense, as source ASIDS, indicating that the source may be something other than a VM, such as a host OS for example, and indicating an application to other architectures that implement ASIDs, other than the IA-64 architecture.

The VMMs 400A, 400B convert guest translations from the VTLBs and possibly from the guest OS page tables, which specify translations from GVPNs to GPPNs, into translations for the guest page tables 413A, 413B, which specify translations from GVPNs to PPNs. Some of these translations from the guest page tables, which will be referred to as hardware translations, are also loaded into the hardware TLB 130, again frequently in response to a TLB miss fault. Each of the hardware translations in the guest page tables and the hardware TLB also includes an RID, and RIDs are also loaded into the hardware RRs 132. The RIDs used in the hardware translations and in the hardware RRs will be referred to as hardware RIDs or, in a more general sense, as shadow ASIDs.

The hardware RIDs used in hardware translations are not necessarily the same as the guest RIDs used in corresponding guest translations. Instead, hardware RIDs are preferably selected to be unique even if the same guest RIDs are used in multiple contexts. For example, suppose the guest OS 313A and the guest OS 313B each uses the same guest RID for guest translations in their respective VTLBs. Nonetheless, different hardware RIDs are preferably used in the corresponding hardware translations in the hardware TLB.

In the exemplary embodiment, each of the VMMs 400A and 400B has a direct execution mode, as well as a binary translation mode. When a VMM is operating in direct execution mode, the privilege level of the hardware CPU 102 is maintained at the least-privileged level. As a result, when guest software attempts to insert a guest RID into a VRR or to insert a guest translation into a VTLB, each of which requires an elevated privilege level, an interruption occurs. A VMM handles the interruption and performs the appropriate insertion into the VRR or the VTLB, using either the binary translation mode or an interpretation mode. In response to an insertion into a VRR, the VMM also makes a corresponding insertion into a hardware RR. However, the VMM may use a different RID for the hardware insertion than was used by the guest software.

For this discussion, suppose that the VM1 300A is currently executing. Suppose, further, that the guest OS 320A attempts to insert a first guest ASID into one of the VRRs 332A. This attempt to insert a guest ASID causes an interruption from the system hardware 100, which causes execution to switch to an interruption handler routine within the VMM1 400A. The VMM1 completes the insertion of the guest ASID into the VRR. FIG. 10A illustrates a method that is performed by the VMM1 and the kernel in response to the insertion of a guest ASID into a VRR, in addition to performing the actual insertion.

The method of FIG. 10A begins at an initial step 730, indicating an insertion of a guest ASID into a VRR. After inserting the guest ASID into the selected VRR, the VMM1 must insert a corresponding shadow ASID into the corresponding RR. First, at a step 732, the kernel may "unlock" an "old" shadow ASID. A "locked" shadow ASID means that the shadow ASID cannot be reallocated to a different guest ASID until it is unlocked. A shadow ASID is generally locked as long as it is contained in at least one of the RRs. In a later step, the VMM1 will insert a new shadow ASID into the RR that corresponds with the VRR into which the guest ASID was inserted. Inserting the new shadow ASID into the RR will overwrite the existing contents of the RR. This may overwrite the only instance of an old shadow ASID within the RRs, which is referred to as "displacing" the old shadow ASID, and which means that the old shadow ASID should be unlocked. Thus, if the RR into which the new shadow ASID will be written contains the only instance of an old shadow ASID within the RRs, then the old shadow ASID is unlocked at the step 732. Next, the method proceeds to a step 734.

Figure 10B:
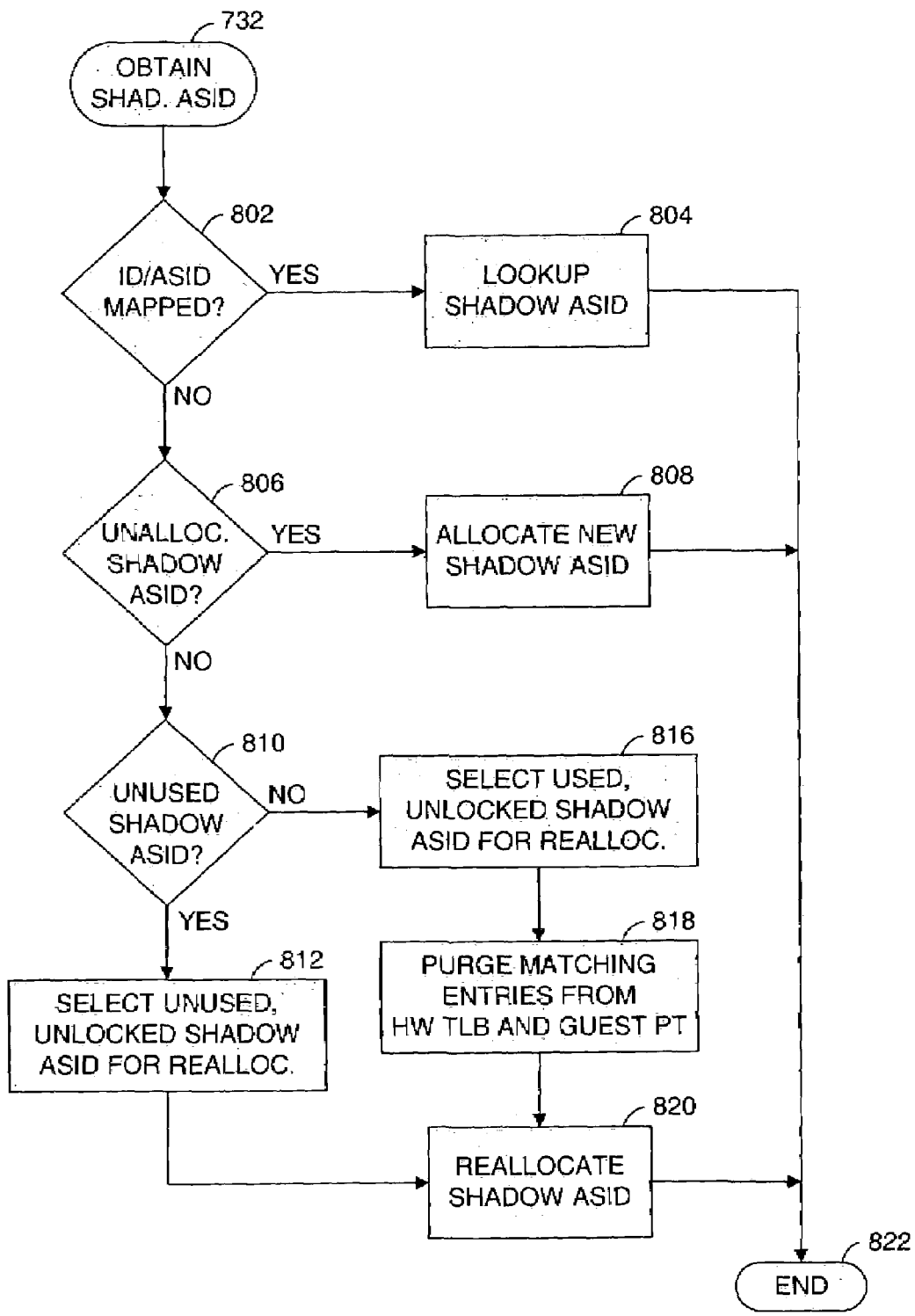
FIG. 10B is a flow chart illustrating a method that is performed by a VMM and kernel in one embodiment of the invention, to identify or assign a shadow ASID to correspond with a source ASID.

At the step 734 the VMM1 communicates to the kernel the guest ASID and the VRR into which the guest ASID was inserted, and the kernel obtains a corresponding shadow ASID according to a method that is illustrated in FIG. 10B, which is described below. In general, the kernel assigns or allocates a unique shadow ASID to each guest ASID. The assigned shadow ASID generally continues to be allocated to the guest ASID until it is reallocated to a different guest ASID. After the kernel obtains a "new" shadow ASID to correspond with the guest ASID, the method of FIG. 10A proceeds to a step 736, where the new shadow ASID is locked.

The kernel returns the new shadow ASID to the VMM1. Next, at a step 738, the VMM1 inserts the shadow ASID into the RR that corresponds with the VRR into which the guest ASID was inserted. As described above and in a patent application that has been incorporated herein, inserting the shadow ASID into the RR may require a region relocation. After the step 738, the method proceeds to a terminal step 740, and the method ends.

The method of FIG. 10B begins at an initial step 732. At this point, a guest ASID has been inserted into a VRR, and the VMM1 has passed the guest ASID to the ASID manager 702 within the kernel 700. The ASID manager 702 performs the method of FIG. 10B to determine a corresponding shadow ASID. In general, the ASID manager assigns a unique shadow ASID to each guest ASID, even if multiple VMs use the same guest ASID. The shadow ASIDs assigned by the ASID manager are also different from the monitor RID. At a step 802, the ASID manager determines whether a shadow ASID has already been assigned (or allocated) to the guest ASID. To accomplish this step, the ASID manager uses the ASID table 704.

As shown in FIG. 9, a first embodiment of the ASID table comprises three columns, including a source ID 704A, a source ASID 704B and a shadow ASID 704C. As described above, a source ASID is a more general term for a guest RID, while a shadow ASID is a more general term for a hardware RID. The source ID column contains information indicating the software entity that generated the source ASID. In the system of FIG. 8, the source ID may identify either the VM1 300A or the VM2 300B. When the ASID manager allocates a shadow ASID to correspond with a source ASID, the ASID manager adds an entry into the ASID table, including the source ID of the entity that generated the source ASID, the actual source ASID and the allocated shadow ASID. In the IA-64 architecture, source ASIDs and shadow ASIDs consist of 24 bits. As shown in FIG. 9, all of the entries in the shadow ASID column 704C are unique, even if there are duplications in the source ASID column 704B.

At the step 802, the ASID manager searches the ASID table for a valid entry that matches the source ID and the source ASID. If a match is found, then a shadow ASID has already been allocated for the source ASID, and the method proceeds to a step 804. If a match is not found, then a shadow ASID has not yet been allocated for this source ASID, and the method proceeds to a step 806. At the step 804, the ASID manager 702 retrieves the shadow ASID 704C from the matching entry in the ASID table and returns the shadow ASID to the VMM1. The VMM1 subsequently inserts this shadow ASID into the corresponding RR. After the step 804, the method of FIG. 10B terminates at a step 822.

At the step 806, the ASID manager checks the ASID table to determine if there are any shadow ASIDs that are not currently allocated to a source ASID, by trying to find a shadow ASID for which there is no valid entry in the ASID table indicating a corresponding source ID and source ASID. If there are any unallocated shadow ASIDs, then the method proceeds to a step 808; otherwise, the method proceeds to a step 810. At the step 808, the ASID manager allocates one of the unallocated shadow ASIDs to the source ASID, and adds a corresponding entry to the ASID table. The shadow ASID that is allocated may be selected from the pool of unallocated shadow ASIDs in any manner, including arbitrary selection or by some algorithm. Preferably, a shadow ASID is selected that is not likely to be used in another context. For example, in a system involving a host OS, such as the system illustrated in FIG. 1, if the ASIDs that are likely to be used by the host OS can be predicted, then the ASID manager will preferably select shadow ASIDs that are not likely to be used by the host OS. The ASID manager returns the selected shadow ASID to the VMM1 for insertion into the RR, and the method of FIG. 10B terminates at the step 822.

At the step 810, the ASID manager determines, if possible, whether there is a shadow ASID that has been allocated, but that is unlocked and for which there are no corresponding hardware translations in either the hardware TLB 130 or the guest page table 413A or 413B of the VM to which the shadow ASID has been allocated. A shadow ASID is defined as being "used" if there is one or more hardware translation containing the shadow ASID in either the hardware TLB or the guest page table. If there are any such "unused" and unlocked shadow ASIDs, the method proceeds to a step 812; otherwise, the method proceeds to a step 816. There may be one or more unused and unlocked, but allocated, shadow ASIDs for various reasons, including (a) because the guest OS loaded a guest ASID into a VRR, but there were never any memory accesses within the address space before the guest ASID was removed from the VRR; or (b) because any hardware translations that did use the shadow ASID were removed from both the hardware TLB and the guest page table because the corresponding guest OS purged the corresponding guest translations from the VTLB, and the guest ASID was removed from the VRR; or (c) because the corresponding VMM flushed any such hardware translations from the hardware TLB and the guest page table due to resource limitations, and the guest ASID was removed from the VRR. At the step 812, the ASID manager selects an unused and unlocked shadow ASID to be allocated to the source ASID. Preferably, the ASID manager selects a shadow ASID that has not been used recently or frequently.

Next, the method proceeds to a step 820, where the ASID manager modifies the ASID table to reflect the allocation of the selected shadow ASID to the new source ASID and the deallocation of the shadow ASID from the previous source ASID, such as by modifying the existing entry in the ASID table that contains the selected shadow ASID to reflect the new source ID and source ASID values. In some embodiments of the invention, however, the entries in the ASID table are arranged by source ID and source ASID, to facilitate more efficient searching by these fields. In these embodiments, the modification of the ASID table to reflect the reallocation of the shadow ASID may be made by deleting or invalidating the entry for the previous source ASID and creating or modifying an entry for the new source ASID to indicate the reallocated shadow ASID. The ASID manager also returns the selected shadow ASID to the VMM1 for insertion into the RR. Next, the method of FIG. 10B terminates at the step 822.

At the step 816, the ASID manager selects an unlocked shadow ASID to be deallocated from an existing source ASID and reallocated to the new source ASID. This time, the ASID manager preferably selects a shadow ASID that has not been used frequently, especially recently, and preferably a shadow ASID that was previously allocated to the executing VM. At a step 818, the ASID manager searches the guest page table 413A or 413B of the VM to which the selected shadow ASID was previously allocated for any hardware translations that contain the selected shadow ASID, and purges any such translations from the page table. Preferably, the ASID manager selects an unused shadow ASID that was previously allocated to the executing VM, if possible, so that the ASID manager does not have to access the page table of a VM that is not currently executing. The ASID manager also purges any matching hardware translations from the hardware TLB 130. Next, the method proceeds to the step 820, which is performed as described above. Finally, the method of FIG. 10B terminates at the step 822.

After the VMM1 adds a corresponding shadow ASID to the RRs, the VMM1 continues the execution or emulation of guest instructions, using direct execution, binary translation or interpretation. On subsequent attempts by the guest OS 320A to insert guest ASIDs into the VRRs 332A, the VMM1 and the ASID manager again perform the same method to insert corresponding shadow ASIDs into the RRs. Similarly, the VMM2 and the ASID manager perform the same method in response to attempts by the guest OS 320B to insert guest ASIDs into the VRRs 332B to insert additional shadow ASIDs into the RRs. As a result, the hardware RRs 132 become populated with unique shadow ASIDs, despite possible common usage of guest ASIDs within the VRRs of the different VMs.

These same shadow ASIDs are also used in hardware translations that are inserted into the guest page tables 413A and 413B and in the hardware TLB 130. These hardware translations correspond to guest translations that are inserted into the VTLBs 330A and 330B, but with the guest ASIDs replaced by their corresponding shadow ASIDs, along with other changes. However, in the exemplary embodiment, the VMMs do not insert hardware translations into either the guest page tables or the hardware TLB in direct response to insertions of guest translations into either the guest OS page tables or the VTLBs. Instead, the VMMs wait for TLB miss faults to occur before making such insertions. In other embodiments, however, a VMM could insert a hardware translation in response to an insertion of a guest translation. In such other embodiments, the methods of FIGS. 10A and 10B may also be used to determine a shadow ASID for use in the hardware translation. In the exemplary embodiment, on the other hand, as well as in various other embodiments, a shadow ASID for use in a hardware translation can be determined by a simple reference to a RR that is determined from a virtual address that gives rise to a TLB miss fault.

In the exemplary embodiment, the VMMs perform a method that is illustrated in FIG. 10C in response to a TLB miss fault in the system hardware 100. Suppose that the VM1 300A is executing again, in direct execution mode, when a TLB miss fault occurs. Execution switches to an interruption handler routine within the VMM1 400A. The VMM1 then executes the method of FIG. 10C.

The method begins at an initial step 760. At a subsequent step 762, the VMM1 checks to see if the TLB miss fault is appropriate to the VM1 300A. In other words, the VMM1 checks to see if a TLB miss fault would have occurred in the VM1 under the existing circumstances if the VM1 were a physical computer system. The VMM1 uses the virtual address that gave rise to the TLB miss fault and looks for a corresponding guest address translation within the VTLB 330A, using a guest ASID obtained from the VRR 332A referenced by the VRN of the virtual address. In the exemplary embodiment, the VMM1 does not look to the guest OS page tables to find the required guest address translation, regardless of whether or not a page table walker is enabled within the VM1, although reference to these page tables is also possible in other embodiments. If the VMM1 does not find a guest translation for the virtual address, so that the TLB miss fault is appropriate to the VM1, the method of FIG. 10C proceeds to a step 764. If the VMM1 does find a guest translation for the virtual address, so that the VM1 should not receive a TLB miss fault, the VMM1 retrieves the guest translation and the method proceeds to a step 766. At the step 764, the VMM1 forwards the TLB miss fault to the VM1, where the guest OS 320A is likely to respond by inserting the required guest translation into the VTLB 330A. Next, the method of FIG. 10C ends at a step 774. After the method of FIG. 10C, after the interruption handler routine in the VMM1 terminates and after the guest OS responds to the TLB miss fault, execution generally resumes with another attempt at executing the instruction that gave rise to the TLB miss fault.

At the step 766, the VMM1 checks for a matching hardware translation within the guest page table 413A, using a shadow ASID obtained from the RR 132 referenced by the VRN of the virtual address. If a matching hardware translation is found, the method of FIG. 10C proceeds to a step 768. Otherwise, the method proceeds to a step 770. At the step 768, the VMM1 inserts the hardware translation from the guest page table 413A into the TLB 130. Next, the method ends at the step 774.

At the step 770, the VMM1 creates a new hardware translation based on information obtained from the guest translation that was obtained in the step 762. However, the VMM1 uses the shadow ASID obtained from the RR referenced by the VRN of the virtual address, instead of using the guest ASID contained in the guest translation. Next, at a step 772, the VMM1 inserts the new hardware translation into the guest page table 413A and the TLB 130. Next, the method ends at the step 774.

Using the methods of FIGS. 10A, 10B and 10C, the VMM1, the VMM2 and the kernel populate the RRs 132 with unique shadow ASIDs, and they populate the TLB 130 and the guest page tables 413A and 413B with hardware translations that use the same unique shadow ASIDs. Even if the VM1 and the VM2 use the same source ASIDs, the shadow ASIDs will be unique in the guest page tables, the hardware TLB and the hardware RRs. Of course, if one of the VMs has multiple guest translations with the same source ASID, as is generally the case, the corresponding hardware translations will also have the same shadow ASID, but the address spaces used by each of the VMs will be unique at the physical hardware level, even if both VMs use the same address space identifiers.

Suppose that both VMs 300A and 300B are currently active. In this situation, the kernel 700 operates in the same general manner as a conventional multiprocessing OS, in the sense that the kernel controls the system hardware 100 to switch back and forth between executing the VM1 and the VM2. When the VM1 is executing, the PTA.base generally points to the VM1 guest page table 413A, while when the VM2 is executing, the PTA.base generally points to the VM2 guest page table 413B, so that, in the event of TLB miss faults, the VHPT walker will look to the correct page table for a required translation. As execution switches back and forth between the two VMs, the hardware TLB 130 will typically be filled with hardware translations for both VMs. Because the ASIDs used in the hardware translations are unique, there is no need to purge translations from the hardware TLB when switching between the VMs. As a result, when a VM is switched out of execution and then back into execution, its address translations could still generally be loaded into the hardware TLB, avoiding TLB miss faults.

ALTERNATIVE EMBODIMENTS

Figure 11:
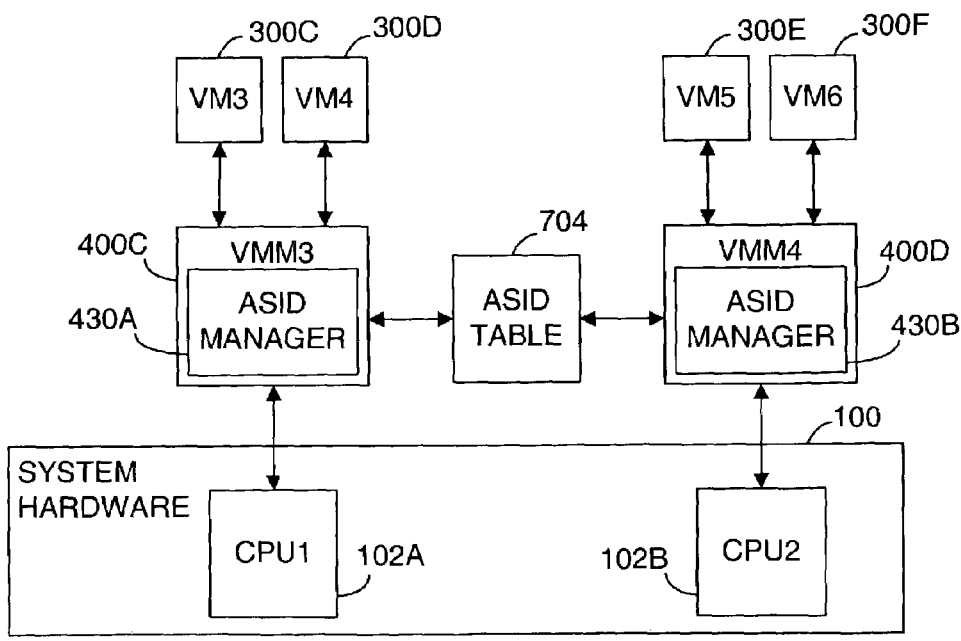
FIG. 11 illustrates another virtual computer system in which the invention may be implemented, the system including two VMMs, with each of the VMMs supporting two separate VMs, and either a kernel or a host OS (not shown).

FIG. 11 illustrates another virtual computer system in which the invention may be implemented. The system of FIG. 11 includes the system hardware 100, a VMM3 400C, a VMM4 400D, a VM3 300C, a VM4 300D, a VM5 300E, a VM6 300F and an ASID table 704. The system hardware 100, which may be the same as described above relative to FIGS. 1 and 2, includes a first CPU 102A and a second CPU 102B. The VM3, the VM4, the VM5 and the VM6 may be the same as the VM1 and the VM2 described above relative to FIG. 8. The ASID table 704 may be the same as described above relative to FIGS. 8 and 9. The VMM3 and the VMM4 may generally be the same as the VMM1 and the VMM2 of FIG. 8, except that the VMM3 and the VMM4 each includes an ASID manager 430A, 430B. Each of the VMMs, VMM3 and VMM4, also supports multiple VMs. The ASID managers 430A, 430B may be functionally equivalent to the ASID manager 702 of FIG. 8. In particular, each ASID manager 430A, 430B performs the methods of FIGS. 10A and 10B to allocate shadow ASIDs for the respective VMMs, along with the method of FIG. 10C to use the shadow ASIDs within hardware translations. The primary difference between the VMM ASID managers 430A, 430B and the kernel ASID manager 702 is that precautions must be taken to allow the VMM ASID managers to share the ASID table 704. Such precautions will be well understood by a person of skill in the art, and will depend on the particular implementation involved. The system of FIG. 11 generally must also include either a host OS 220 as illustrated in FIG. 1 or a kernel 700 as illustrated in FIG. 2.

FIGS. 8 and 11 are only two of many different possible configurations in which the invention may be implemented. The configurations in FIGS. 8 and 11 can be changed in numerous different ways, including adding additional CPUs, additional VMMs and additional VMs, without precluding the implementation of the invention.

Figure 12A:
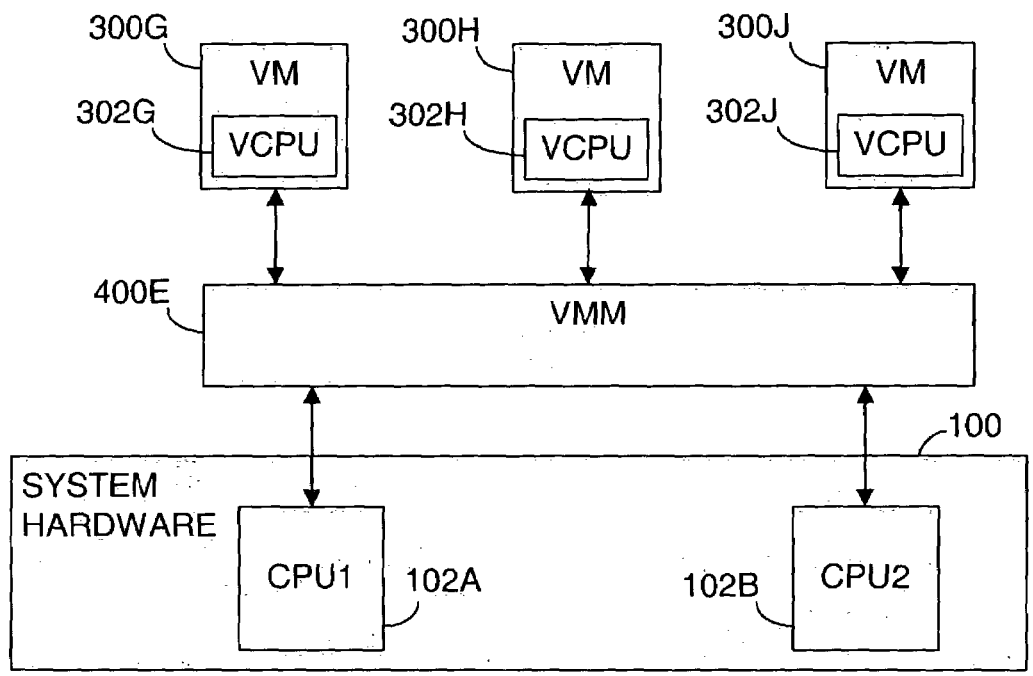
FIGS. 12A, 12B and 12C illustrate additional virtual computer systems in which the invention may be implemented, each system including a VMM, one or more VMs, multiple virtual CPUs, and either a kernel or a host OS (not shown).
Figure 12B:
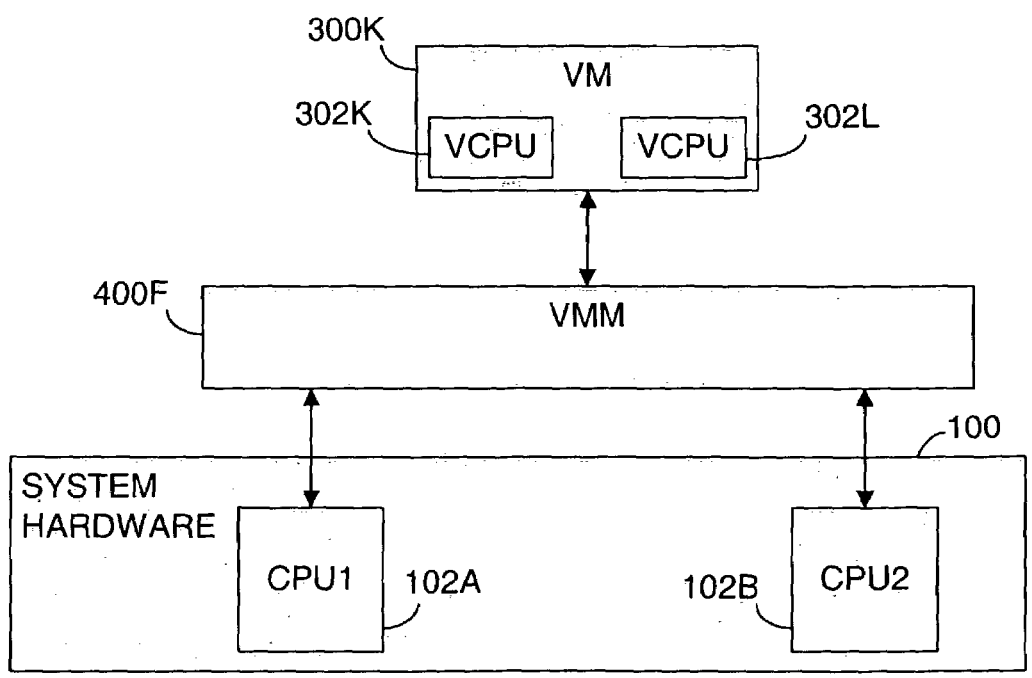
Figures 12C, 13A:
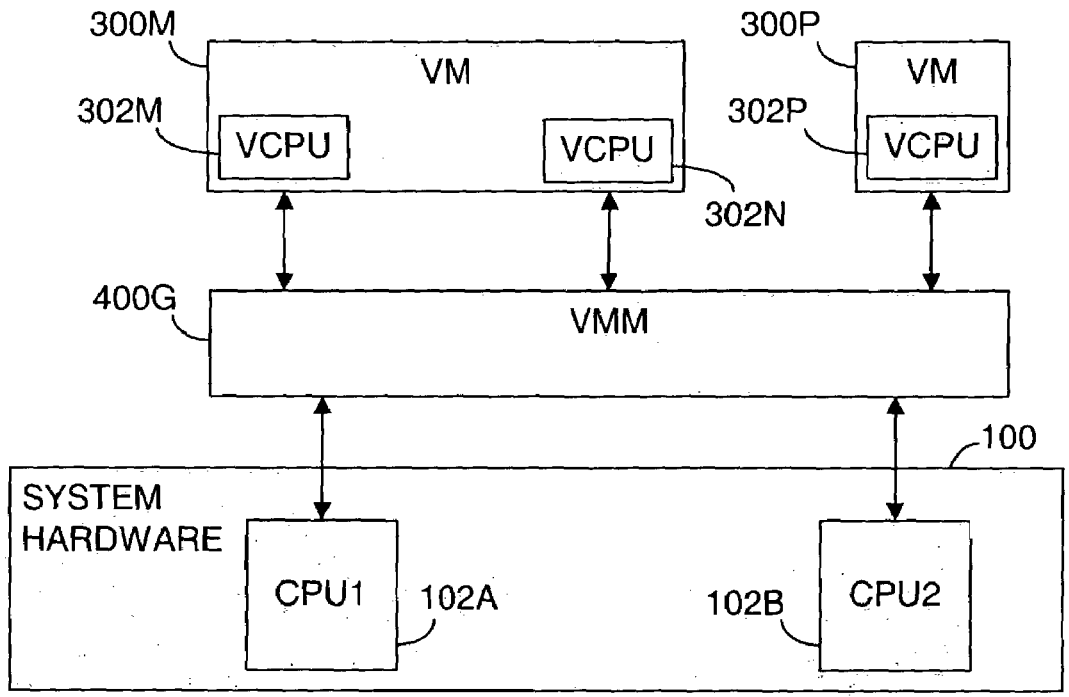
FIGS. 13A and 13B illustrate alternate embodiments of the ASID table illustrated in FIG. 9, for use in the virtual computer systems of FIGS. 12A, 12B and 12C.

FIGS. 12A, 12B and 12C illustrate additional multiprocessor systems in which the invention may be implemented. The systems of FIGS. 12A, 12B and 12C may be conventional symmetrical multiprocessor (SMP) systems, for example. Each of the systems of FIGS. 12A, 12B and 12C includes a system hardware 100, which may be the same as described above relative to FIGS. 1 and 2, and which includes a first CPU 102A and a second CPU 102B. The systems of FIGS. 12A, 12B and 12C generally must also include either at host OS 220 as illustrated in FIG. 1 or a kernel 700 as illustrated in FIG. 2.

FIG. 12A further includes a VMM 400E, which supports a first VM 300G, which includes a first VCPU 302G; a second VM 300H, which includes a second VCPU 302H; and a third VM 300J, which includes a third VCPU 302J. FIG. 12B further includes a VMM 400F, which supports a single VM 300K, which includes a first VCPU 302K and a second VCPU 302L. FIG. 12C further includes a VMM 400G, which supports a first VM 300M, which includes a first VCPU 302M and a second VCPU 302N, along with a second VM 300P, which includes a single VCPU 302P. The VMMs 400E, 400F and 400G may be similar to the other VMMs described above, while the VMs 300G, 300H, 300J, 300K, 300M and 300P may be similar to the other VMs described above. However, the VMs 300K and 300M are virtualizations of multiprocessor computer systems, such as SMP systems.

The invention may be implemented in the systems of FIGS. 12A, 12B and 12C, along with other, similar systems, in a manner that is very similar to the implementation described above. Some modifications to the implementation described above may be advantageous, however.

One modification relates to the dual CPUs 102A and 102B in each of the systems. Each of the CPUs 102A and 102B typically has its own TLB and RRs. As a result, the same shadow ASIDs may be used on each of the CPUs to represent different address spaces, without having to purge TLB entries and without having conflicts between the address translations of different address spaces, so long as the multiple uses of the same shadow ASIDS are consistently maintained on the different CPUs. For example, referring to FIG. 12A, if the VMM 400E (or the kernel) ensures that the VM 300G only executes on the CPU 102A and that the VM 300J only executes on the CPU 102B, then the same shadow ASIDs may be used to correspond with the guest ASIDs from each of these VMs. The shadow ASIDs for the VM 300G would be loaded into the TLB and RRs of the CPU 102A, while the shadow ASIDs for the VM 300J would be loaded into the TLB and RRs of the CPU 102B. There would be no adverse consequences from using the same shadow ASIDs for these two VMs. Many other variations of this general concept are also possible.

Another modification relates to the dual VCPUs in the VMs 300K and 300M. Just as common shadow ASIDs may be used on the dual physical CPUs as described above, the VM 300K may use common guest ASIDs on the dual VCPUs 302K and 302L and the VM 300M may use common guest ASIDs on the dual VCPUs 302M and 302N in the same manner. If a VM does use common guest ASIDs on multiple VCPUs in this manner, the VMM supporting the VM should preferably keep track of the different uses of the common guest ASIDs to avoid virtual addressing conflicts on the physical CPUs. The VMM and/or the kernel may assign unique shadow ASIDs to the different uses of the common guest ASIDS, in the same manner as described above for the usage of common ASIDs across multiple VMs. Thus, referring to FIG. 12B, if a first guest ASID were used to represent two different guest virtual address spaces, one on the first VCPU 302K and the other on the second VCPU 302L, a first shadow ASID would be assigned to the use of the first guest ASID on the first VCPU 302K, while a second shadow ASID would be assigned to the use of the first guest ASID on the second VCPU 302L.

FIG. 13A shows an ASID table 705, which is an alternative implementation for the ASID table 704 illustrated in FIG. 9. The ASID table 705 comprises five columns, including a VM ID 705A, a VCPU ID 705B, a virtual ASID (VASID) 705C, a CPU ID 705D and a shadow ASID (SASID) 705E. The VM ID 705A identifies the VM from which a guest ASID derives. For example, in the system of FIG. 12A, the VM ID indicates whether a guest ASID was generated by the VM 300G, the VM 300H or the VM 300J. The VCPU ID 705B identifies the VCPU on which the guest ASID is used. For example, in the system of FIG. 12B, the VCPU ID indicates whether the guest ASID is used on the VCPU 302K or the VCPU 302L. The VASID 705C is generally the same as the source ASID 704B described above, namely the ASID that is used within a VM and for which a corresponding shadow ASID is required. The shadow ASID 705E is generally the same as the shadow ASID 704C described above. The CPU ID 705D identifies the physical CPU on which the shadow ASID is used. Thus, the CPU ID indicates whether the shadow ASID will be used on the CPU 102A or the CPU 102B in the FIGS. 12A, 12B and 12C.

The VM ID 705A combined with the VCPU ID 705B is analogous to the source ID 704A. In fact, the combination of the VM ID and the VCPU ID may be considered a source ID. Specifying a VCPU ID, along with a VM ID, enables an ASID manager (in either a VMM or a kernel) to keep track of common guest ASIDs that are used on multiple VCPUs within the same VM. As an example, referring to FIG. 12C, suppose that the VM 300M uses the same guest ASID, such as the ASID 27, to represent a first address space on the VCPU 302M and to represent a second address space on the VCPU 302N. This common usage of the guest ASID 27 is noted in the ASID table of FIG. 13A in the first and third substantive rows of the table. The first row indicates a VM ID of 300M, a VCPU ID of 302M and a VASID of 27, while the third row indicates a VM ID of 300M, a VCPU ID of 302N and a VASID of 27. Having separate rows for the separate uses of the same guest ASID enables the ASID manager to assign unique shadow ASIDs for each use and to keep track of the unique shadow ASIDs. As illustrated in FIG. 13A, the guest ASID 27, as used on the VCPU 302M, has been assigned a shadow ASID of 27 as shown in the first row, while the same guest ASID, as used on the VCPU 302N, has been assigned a shadow ASID of 50 as shown in the third row.

As illustrated in FIG. 13A, the column for the VCPU ID 705B suggests that a different value is used for each VCPU in the computing system. If each VCPU in the system is given a unique ID value, then the VM ID column 705A is superfluous and may be deleted from the ASID table. On the other hand, if the VM ID column is implemented, as illustrated in FIG. 13A, then the VCPU ID values need not be unique over the entire system. Instead, the VCPU ID values need only be unique within each VM. For example, in the system of FIG. 12C, the VCPU ID of the VCPU 302M could be a value of one, the VCPU ID of the VCPU 302N could be a value of two, and the VCPU ID of the VCPU 302P could be a value of one. In this case, the different VM ID between the VM 300M and the VM 300P may be used to distinguish between the VCPU 302M and the VCPU 302P, each of which has a VCPU ID value of one. In other words, in the terminology of relational databases, the combination of the VM ID, the VCPU ID and the VASID form the key for the table. No two entries in the table can have the same combination of values for those three columns.

The CPU ID column 705D enables common shadow ASIDs to be used to represent multiple address spaces on multiple physical CPUs, as described above. As illustrated in the second row and in the last row of FIG. 13A, multiple guest ASIDs have been assigned the same shadow ASID value of 42. Specifically, both a first address space represented by the guest ASID 13 on the VCPU 302P within the VM 300P and a second address space represented by the guest ASID 42 on the VCPU 302N within the VM 300M have been assigned the same shadow ASID value of 42. However, as shown in the CPU ID column 705D, the former shadow ASID is assigned for use on the CPU 102B, while the latter shadow ASID is assigned for use on the CPU 102A. Thus, the VMM 400G inserts translations for the first address space in the TLB for the CPU 102B and translations for the second address space in the TLB for the CPU 102A. The VMM 400G must also ensure that any software that may use the first address space is only executed on the CPU 102B, while any software that may use the second address space is only executed on the CPU 102A.

Figures 13B, 14:
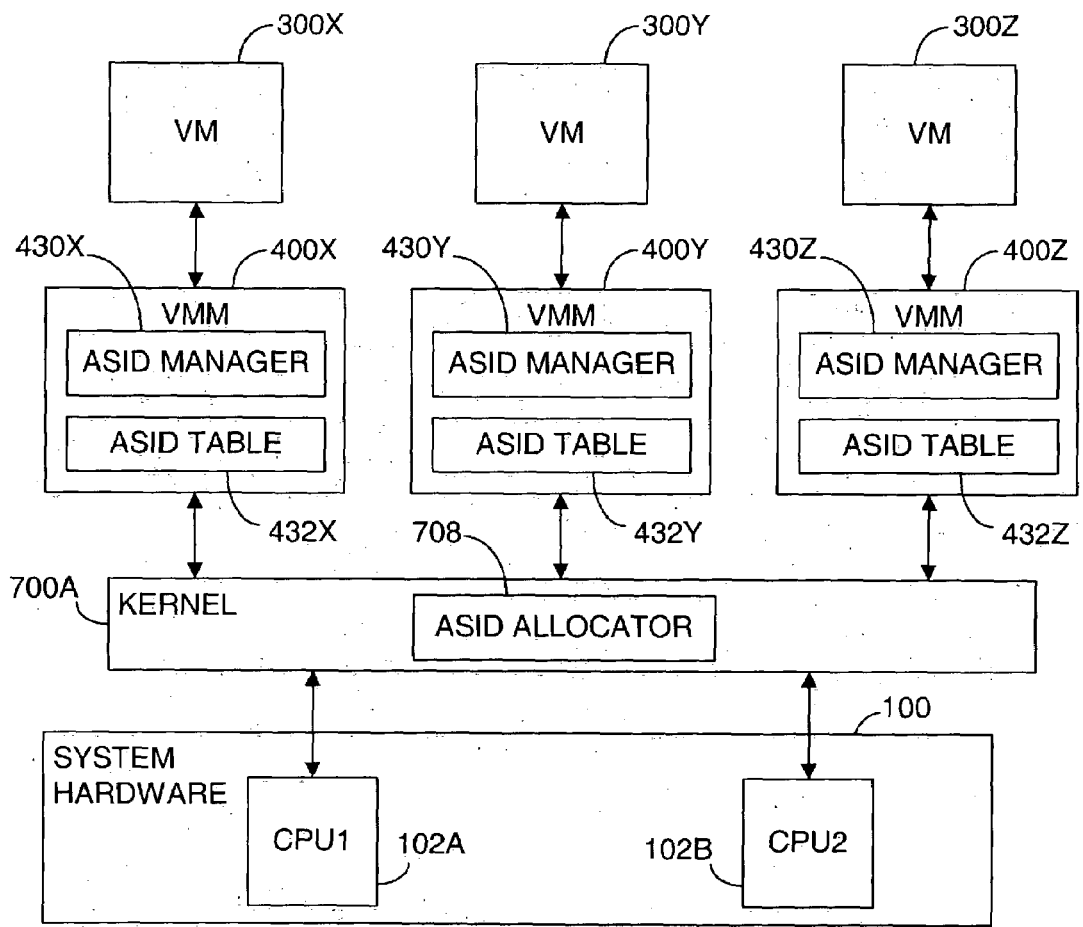
FIG. 14 illustrates another virtual computer system in which an alternate embodiment of the invention may be implemented, the system including a kernel and three VMMs, with each of the VMMs supporting a single VM.

FIG. 13B illustrates a simpler alternative to the ASID table 705 of FIG. 13A. An ASID table 706 of FIG. 13B comprises four columns, including a VM ID 706A, which is substantially the same as the VM ID 705A, a VCPU ID 706B, which is substantially the same as the VCPU ID 705B, a VASID 706C, which is substantially the same as the VASID 705C, and a SASID 706E, which is substantially the same as the SASID 705E. The ASID table 706 is substantially the same as the ASID table 705 of FIG. 13A, except the ASID table 706 does not have a CPU ID column. The ASID table 706 may be used if common ASIDs are not to be used on multiple physical CPUs, or, in other words, if a unique shadow ASID is to be assigned to each usage of a guest ASID regardless of which physical CPU(s) on which the shadow ASID will be used. In this case, the CPUs on which software may be executed are generally not limited by the address spaces that may be accessed by the software.

FIG. 14 illustrates another, alternative embodiment of the invention. The system of FIG. 14 includes the system hardware 100, including the CPU 102A and the CPU 102B, each of which may be the same as described above. The system also includes a kernel 700A that supports three VMMs 400X, 400Y and 400Z. Each VMM supports at least one VM 300X, 300Y or 300Z, as shown. The kernel 700A includes an ASID allocator 708. The VMM 400X includes an ASID manager 430X and an ASID table 432X, the VMM 400Y includes an ASID manager 430Y and an ASID table 432Y, and the VMM 400Z includes an ASID manager 430Z and an ASID table 432Z. The ASID tables 432X, 432Y and 432Z may be substantially the same as one or more of the ASID tables described above, and the ASID managers 430X, 430Y and 430Z may be substantially the same as the ASID managers described above, except for the differences described below. The kernel 700A, the VMMs 400X, 400Y and 400Z, and the VMs 300X, 300Y and 300Z may also be substantially the same as the respective units described above, except for the differences described below.

The ASID allocator 708 allocates unique shadow ASIDs to the ASID managers 430X, 430Y and 430Z in a manner that is analogous to the way an OS allocates memory to processes. For example, the ASID manager 430X may request an allocation of one or more shadow ASIDs, and, in response, the ASID allocator 708 may allocate one or more shadow ASIDs that have not yet been allocated to the ASID manager 430X. Each ASID manager only uses its own allocation of shadow ASIDs and the ASID allocator does not allocate any shadow ASID to more than one ASID manager. Each ASID manager assigns (or further allocates) a unique shadow ASID for each guest ASID that derives from the one or more VMs that are hosted by the VMM. For example, the ASID manager 430X assigns a unique shadow ASID for each guest ASID that is used within the VM 300X, from a pool of ASIDs that are allocated to the ASID manager 430X from the ASID allocator 708.

The methods of FIGS. 10A, 10B and 10C may generally be used in the system of FIG. 14 substantially as they are described above, except for the modifications described here. For this description, suppose that a guest ASID is inserted into a VRR within the VM 300X. A first modification to the methods of FIGS. 10A, 10B and 10C is that the methods are performed by a combination of the ASID managers 430X, 430Y and 430Z and the ASID allocator 708. For example, instead of consulting an ASID manager in the kernel to obtain a shadow ASID, the VMMs 400X, 400Y and 400Z contain their own ASID managers which perform most of the steps illustrated in FIG. 10B. At the step 802, for example, the ASID manager 430X checks the ASID table 432X to determine if a shadow ASID has already been assigned or allocated to the guest ASID. Similarly, at the step 806, the ASID manager 430X checks the ASID table 432X to determine if there is a shadow ASID that has been allocated to the ASID manager 430X by the ASID allocator 708, but not yet assigned or allocated to a guest ASID.

A second modification involves an additional step that is inserted between the steps 806 and 810. At this added step, the ASID manager 430X requests that the ASID allocator 708 allocate one or more additional shadow ASIDs to the ASID manager 430X. The ASID allocator 708 generally fulfills the request if there are shadow ASIDs available for allocation. If the request is fulfilled, the ASID manager 430X allocates a new shadow ASID to the guest ASID, as described above relative to the step 808. If a shadow ASID is not available for allocation by the ASID allocator, the request is denied, and the method proceeds to the step 810.

A third modification, which is optional, involves obtaining a shadow ASID for reallocation, as illustrated in the steps 810, 812 and 816. In addition to checking the ASID table 432X for shadow ASIDs that may be reallocated, the ASID manager 430X may also seek such shadow ASIDs from the other ASID tables 432Y and 432Z. However, seeking such shadow ASIDs from the other ASID tables would require access to the other tables by either the ASID manager 430X or the ASID allocator 708, and/or coordination with the other ASID managers 430Y and 430Z. For example, if a shadow ASID from the ASID table 432Y were to be selected for reallocation, the ASID table 432Y would need to be accessed to determine the shadow ASID's availability for reallocation and to modify an appropriate entry in the table to reflect the deallocation of the shadow ASID. In addition, the appropriate guest page table and hardware TLB(s) would need to be purged of any matching entries.

Instead of the third modification, however, or in addition to the third modification, another option is preferred. Under this option, the ASID manager 430X generally does not look any further than its own ASID table for a shadow ASID for reallocation. However, a separate method is performed to maintain an efficient distribution of shadow ASIDs among the ASID managers, so that each ASID manager will generally always have shadow ASIDs that are readily available for allocation. Under this method, each ASID manager reports recurrently to the ASID allocator 708 regarding its relative effectiveness in finding unallocated shadow ASIDs versus having to reallocate shadow ASIDs. For example, each ASID manager may report the ratio of occurrences of having to reallocate shadow ASIDs to the total number of allocations performed by the ASID manager (the "reallocated ratio"), the ratio being calculated and reported over a constant period of time or over a constant number of ASID allocations. Then, at appropriate times, the ASID allocator performs a load balancing function to determine an efficient distribution of shadow ASIDs, based on the reporting from the ASID managers, and the ASID allocator takes appropriate actions to redistribute the shadow ASIDs accordingly. For example, the ASID allocator may request that a first ASID manager, with a relatively low reallocated ratio, return a specified number of previously allocated shadow ASIDs, so that the shadow ASIDs may be reallocated to a second ASID manager, with a relatively high reallocated ratio. Each ASID manager must implement a function to deallocate shadow ASIDs so that the specified number of shadow ASIDs may be returned to the ASID allocator.

Under some circumstances, all, or substantially all, of the shadow ASIDs for each of the ASID managers may become allocated, so that each ASID manager will recurrently report a very high percentage of reallocated shadow ASIDs, reducing the effectiveness of the redistribution of shadow ASIDs. For this reason, a second criterion may also be considered in determining an efficient distribution of shadow ASIDs. Each ASID manager also reports to the ASID allocator the ratio of used shadow ASIDs to the total number of shadow ASIDs that are currently allocated to the ASID manager (the "used ratio"). If the reallocated ratios are substantially equal between multiple ASID managers, but there is a substantial difference between the used ratios, then the ASID allocator may reallocate ASIDs from the ASID managers that have a relatively low used ratio to those with a relatively high used ratio.

Figure 15B:
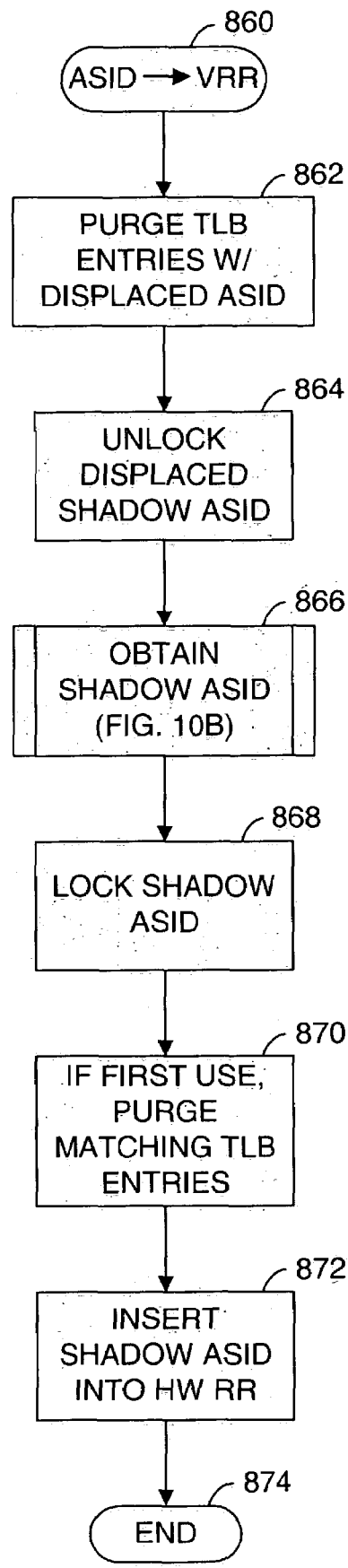
FIG. 15B is a flow chart illustrating a method that is performed in the hosted embodiment, when a guest ASID is inserted into a virtual region register.

The invention may also be implemented in the system of FIG. 1, with only a single VM 300. In this case, the VMM 400 may determine which ASIDs are used by the host OS 220, and allocate unique ASIDs for use by the VM 300. Then, in case execution switches back and forth between the VM 300 and one or more applications 260 executing in the host environment, purges or flushes of the TLB may be limited. This same approach may be applied to other configurations, involving multiple VMs, so that the VMM(s) attempt to assign shadow ASIDs that are unique among all the VMs and the host OS. Such an implementation assumes, however, that the VMM has knowledge of the ASIDs that are used by the host OS. Similar implementations are also possible that do not assume such knowledge. FIGS. 15A, 15B and 15C illustrate methods that may be performed in such implementations, which do not assume knowledge of the ASIDs used by a host OS. In general, these methods purge, from the hardware TLB, potentially conflicting host address translations when switching to the VM context and potentially conflicting VM context translations when switching to the host context. So, the methods of FIGS. 15A, 15B and 15C may be used in hosted systems, such as the system of FIG. 1, with one or more VMMs supporting one or more VMs each. These methods are described below as applied to the system of FIG. 1.

FIG. 15A illustrates a method that is performed during a context switch from the host context to a VM context. The method begins at an initial step 830. Next, at a step 832, the VMM 400 restores from memory the contents of the hardware RRs to the state that existed when the system last switched out of the VM context. The contents of the RRs include the monitor RID and a number of shadow ASIDs, which correspond to guest ASIDs. The shadow ASIDs that are restored to the RRs remain locked from when the system last switched out of the VM context.

Next, at a step 834, the VMM purges any entries from the hardware TLB that contain any of the ASIDs that were restored to the RRs in the step 832. Alternatively, in a preferred embodiment, the VMM only purges any such entries that may conflict with address translations from the VM context. To accomplish this, the VMM maintains a list for each allocated shadow ASID that indicates address ranges within the corresponding address space that may be accessed in the VM context. Thus, for example, for each new address translation used within a VM, a new item is added to the appropriate list, indicating the address range that may be accessed using the new address translation. For simplicity, possibly conflicting address ranges are specified in blocks having a fixed-size, such as 4 gigabytes, for example. Thus, in this alternative implementation, at the step 834, for each shadow ASID in the hardware RRs, the corresponding list is consulted, and any address translations in the hardware TLB having the shadow ASID and that may conflict with the address ranges specified in the list are purged from the TLB.

Next, at a step 836, any remaining steps required to complete the switch from the host context to the VM context are performed in a conventional manner. Then, the method of FIG. 15A ends at a step 838, and execution continues within the VM context.

FIG. 15B illustrates a method that may be performed in this embodiment when a guest ASID is inserted into a VRR. The method is similar to the method of FIG. 10A and begins at an initial step 860. Later in this method, a shadow ASID will be inserted into a hardware RR. If the insertion of the shadow ASID will displace another shadow ASID, as described above relative to the step 734 of FIG. 10A, then, at a step 862, the VMM 400 purges from the hardware TLB any guest translations containing the displaced shadow ASID. The guest translations may be distinguished from other translations that may still be in the TLB from the host context by referring to the appropriate list described above. Only address translations that relate to the address ranges specified in the list for the displaced shadow ASID are purged from the TLB.

Next, at a step 864, if a shadow ASID will be displaced, the VMM 400 unlocks the displaced shadow ASID, also as described above relative to the step 734. Next, at a step 866, the VMM 400 obtains a shadow ASID to correspond with the guest ASID that has been inserted into the VRRs. This step is accomplished using a method that is substantially the same as the method of FIG. 10B, except that the ASID manager and the ASID table are contained within the VMM 400, instead of being within a separate kernel.

Next, at a step 868, the obtained shadow ASID is locked, as described above relative to the step 736 of FIG. 10A. Next at a step 870, if this is the first time that this shadow ASID has been contained in one of the RRs since the context was last switched from the host context to the VM context, then the hardware TLB is purged of any matching entries, as described above relative to the step 834 of FIG. 15A. Next, at a step 872, the VMM 400 inserts the shadow ASID into a hardware RR, as described above relative to the step 738 of FIG. 10A. The method of FIG. 15B ends at a step 874.

The method of FIG. 10C for responding to a TLB miss fault may also be used in this alternative embodiment in substantially the same form as described above, except that, when a hardware translation is inserted into the hardware TLB and the guest page table at the step 772, a corresponding item is added to the corresponding list and the hardware TLB is purged of any translations that could conflict with the newly inserted hardware translation.

FIG. 15C illustrates a method that is performed during a context switch from a VM context to the host context. The method begins at an initial step 880. Next, at a step 882, the VMM purges any entries from the hardware TLB that contain any of the ASIDs that are currently stored in the hardware RRs and that relate to the address ranges specified in the corresponding lists described above. Next, at a step 884, the VMM 400 restores from memory the contents of the hardware RRs to the state that existed when the system last switched from the host context to the VM context. Next, at a step 886, any remaining steps required to complete the switch from the VM context to the host context are performed in a conventional manner. Then, the method of FIG. 15C ends at a step 888, and execution continues within the host context.

Finally, the invention may be implemented in other virtual computer systems that use ASIDs, but that don't involve the IA-64 architecture, including systems for which the virtualized architecture is not the same as the actual physical architecture.

The invention claimed is:

1. A method of managing address space identifiers (ASIDs) in a virtual computer system, the virtual computer system comprising a physical hardware system that uses ASIDs, the physical hardware system supporting a virtual machine that also uses ASIDs, the virtual computer system further comprising one or more other software entities, the method comprising:
    allowing guest ASIDs to be selected and used for address translations within the virtual machine independently of the one or more other software entities;
    determining which ASIDs are in use by the one or more other software entities;
    allocating a shadow ASID for each guest ASID used within the virtual machine, each shadow ASID being unique from all other allocated shadow ASIDs and from the ASIDs that are in use by the one or more other software entities; and
    using the allocated shadow ASIDs within the physical hardware system for address translations related to the virtual machine.

2. The method of claim 1, in which one of the other software entities is a second virtual machine.

3. The method of claim 1, in which the step of determining which ASIDs are in use by the one or more other software entities is accomplished by maintaining and consulting an ASID table listing ASIDs that have been used in the virtual computer system.

4. The method of claim 1, in which the step of allocating a unique shadow ASID sometimes requires that a previously allocated shadow ASID be deallocated.

5. The method of claim 4, in which the deallocation of a previously allocated shadow ASID sometimes requires that one or more entries be purged from a hardware TLB.

6. The method of claim 1, in which a shadow ASID is allocated to a guest ASID in response to an address translation being inserted into a virtual TLB, the address translation including the guest ASID.

7. The method of claim 1, in which an allocated shadow ASID is used within the physical hardware system by inserting an address translation into a hardware TLB, the address translation including the allocated shadow ASID.

8. A method of managing address space identifiers (ASIDs) in a virtual computer system, the virtual computer system comprising a physical hardware system supporting a plurality of virtual machines, the method comprising:
    allowing each virtual machine to use its own guest ASIDs, independently of the other virtual machines, for address translations within the respective virtual machine;
    maintaining a record of allocations of shadow ASIDs to the guest ASIDs of the plurality of virtual machines; and
    for a new guest ASID, allocating a new shadow ASID for use in corresponding address translations within the physical hardware system by consulting the record of allocations and performing the following steps:
        if there are one or more shadow ASIDs that are not allocated to guest ASIDs, allocating one such shadow ASID to the new guest ASID;
        otherwise, if there are one or more shadow ASIDs that are not currently being used in any address translations in a hardware TLB, deallocating one such shadow ASID and reallocating the deallocated shadow ASID to the new guest ASID; or
        otherwise, selecting a shadow ASID that is currently being used in one or more address translations in the hardware TLB, purging said one or more address translations from the hardware TLB, deallocating the selected shadow ASID and reallocating the selected shadow ASID to the new guest ASID.

9. The method of claim 8 further comprising, in response to a current guest ASID being used in an address translation being inserted into a virtual TLB of a virtual machine, consulting the record of allocations and, if a shadow ASID has already been allocated for the current guest ASID, using the already allocated shadow ASID in a corresponding address translation and inserting the corresponding address translation into the hardware TLB, otherwise performing the step of allocating a new shadow ASID, with the current guest ASID being the new guest ASID, and using the new shadow ASID in the corresponding address translation and inserting the corresponding address translation into the hardware TLB.

10. The method of claim 8 further comprising, if a shadow ASID is deallocated, purging all entries in a page table that contain the deallocated shadow ASID before reallocating the deallocated shadow ASID.

11. The method of claim 8, wherein if all shadow ASIDs are allocated to guest ASIDs, but there are one or more shadow ASIDs that are not currently being used in any address translations in the hardware TLB, selecting an unused shadow ASID for deallocation and reallocation that was previously allocated to a guest ASID from the same virtual machine as the new guest ASID, if there are any such shadow ASIDs.

12. The method of claim 8, wherein the step of maintaining a record of allocations involves maintaining an ASID table comprising multiple entries, with each entry including a source ID value, a source ASID value and a shadow ASID value.

13. The method of claim 12, wherein if a shadow ASID is deallocated and reallocated, the ASID table is modified to indicate that the reallocated shadow ASID is allocated to the new guest ASID and source ID, instead of to the guest ASID and source ID to which the shadow ASID was previously allocated.

14. A computer program embodied in a computer-readable storage medium, the computer program being executable in a virtual computer system using address space identifiers (ASIDs) in both the physical architecture and the virtualized architecture, the virtual computer system supporting a plurality of virtual machines, each of the virtual machines using one or more guest ASIDs within the virtualized architecture, the computer program comprising:
  one or more ASID managers for allocating a unique shadow ASID for each guest ASID that is in use in the virtual machines, the unique shadow ASIDs being used within the physical architecture; and
  an ASID table for maintaining information regarding the allocations between shadow ASIDs and guest ASIDs.

15. The computer program of claim 14, in which the ASID table comprises multiple entries, with each entry comprising a source ID value, a source ASID value and a shadow ASID value.

16. The computer program of claim 15, in which the one or more ASID managers allocate a shadow ASID for a guest ASID by performing the following steps:
  consulting the ASID table for an entry for which the source ID and source ASID match the guest ASID and the virtual machine in which the guest ASID is used; and
  if there are one or more shadow ASIDs that are not allocated to guest ASIDs, allocating one such shadow ASID to the guest ASID;
  otherwise, if there are one or more shadow ASIDs that are not currently being used in any address translations in a hardware TLB, deallocating one such shadow ASID and reallocating the deallocated shadow ASID to the guest ASID; or
  otherwise, selecting a shadow ASID that is currently being used in one or more address translations in the hardware TLB, purging said one or more address translations from the hardware TLB, deallocating the selected shadow ASID and reallocating the selected shadow ASID to the guest ASID.

17. The computer program of claim 16, wherein if a shadow ASID is deallocated, the one or more ASID managers further purge all entries in a page table that contain the deallocated shadow ASID before reallocating the deallocated shadow ASID.

18. The computer program of claim 16, wherein if a shadow ASID is deallocated and reallocated, the one or more ASID managers further modify the ASID table to indicate that the reallocated shadow ASID is now allocated to the guest ASID.

19. The computer program of claim 14, in which the one or more ASID managers and the ASID table form part of a kernel that supports multiple virtual machine monitors, with each virtual machine monitor supporting one or more virtual machines.

20. The computer program of claim 14, in which the virtual computer system comprises multiple virtual machine monitors, with each virtual machine monitor supporting one or more virtual machines, and the computer program comprises an ASID manager for each of the multiple virtual machine monitors, with each ASID manager allocating shadow ASIDs for the virtual machines supported by the respective virtual machine monitors, and with the multiple ASID managers sharing access to the ASID table.

\* \* \* \* \*